(12) United States Patent  
Tran et al.

(10) Patent No.: US 8,537,489 B1
(45) Date of Patent: Sep. 17, 2013

(54) DETECTING RADIAL HEAD POSITION USING SPIRAL WEDGE INFORMATION IN SELF-SERVO-WRITE

(75) Inventors: Hiep The Tran, Milpitas, CA (US); Jason Bellorado, Santa Clara, CA (US)

(73) Assignee: SK hynix memory solutions inc., San Jose, CA (US)

(*) Notice: Subject to any disclaimer, the term of this patent is extended or adjusted under 35 U.S.C. 154(b) by 262 days.

(21) Appl. No.: 13/102,981

(22) Filed: May 6, 2011

Related U.S. Application Data

(60) Provisional application No. 61/395,329, filed on May 10, 2010.

(51) Int. Cl.
*G11B 5/596* (2006.01)

(52) U.S. Cl.
USPC .................................. 360/77.06; 360/77.08

(58) Field of Classification Search
USPC ..................... 360/31, 55, 75–77.11
See application file for complete search history.

(56) References Cited

U.S. PATENT DOCUMENTS

| 6,987,636 | B1 * | 1/2006 | Chue et al. ............... 360/75 |
| 7,068,459 | B1 | 6/2006 | Cloke et al. |
| 7,375,918 | B1 | 5/2008 | Shepherd et al. |
| 7,411,758 | B1 * | 8/2008 | Cheung et al. .......... 360/75 |
| 2008/0144210 | A1 * | 6/2008 | Dougherty et al. ....... 360/77.02 |
| 2008/0151413 | A1 * | 6/2008 | Mizukoshi et al. ....... 360/77.05 |

* cited by examiner

*Primary Examiner* — Nathan Danielsen
(74) *Attorney, Agent, or Firm* — Van Pelt, Yi and James LLP

(57) ABSTRACT

Writing servo wedge code to a disk is disclosed. A first selected burst demodulation window is determined. A final radial head position is computed based at least in part on the first selected burst demodulation window. Servo wedge code is written to a disk based at least in part on the final radial head position.

20 Claims, 21 Drawing Sheets

DETECTING RADIAL HEAD POSITION USING SPIRAL WEDGE INFORMATION IN SELF-SERVO-WRITE

CROSS REFERENCE TO OTHER APPLICATIONS

This application claims priority to U.S. Provisional Patent Application No. 61/395,329 entitled DETECTING RADIAL HEAD POSITION USING SPIRAL WEDGE INFORMATION IN SELF-SERVO-WRITE filed May 10, 2010, which is incorporated herein by reference for all purposes.

BACKGROUND OF THE INVENTION

A hard disk drive (HDD) is a device for writing and reading digital data. Data is magnetically read from and written to rotating disks by read and write heads that hover close to the surface of the disk. An arm moves the heads across the disks as they spin, allowing each head to access various locations on the surface of the disk.

A servo system is used to control the movement of the arm and the rotation of the disk. Servo code is written to certain portions of the HDD and is used by the servo system to control the position of the heads when they read and write. Because of this, the accuracy and precision of where the servo code is written is important. Improved techniques for servo writing would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
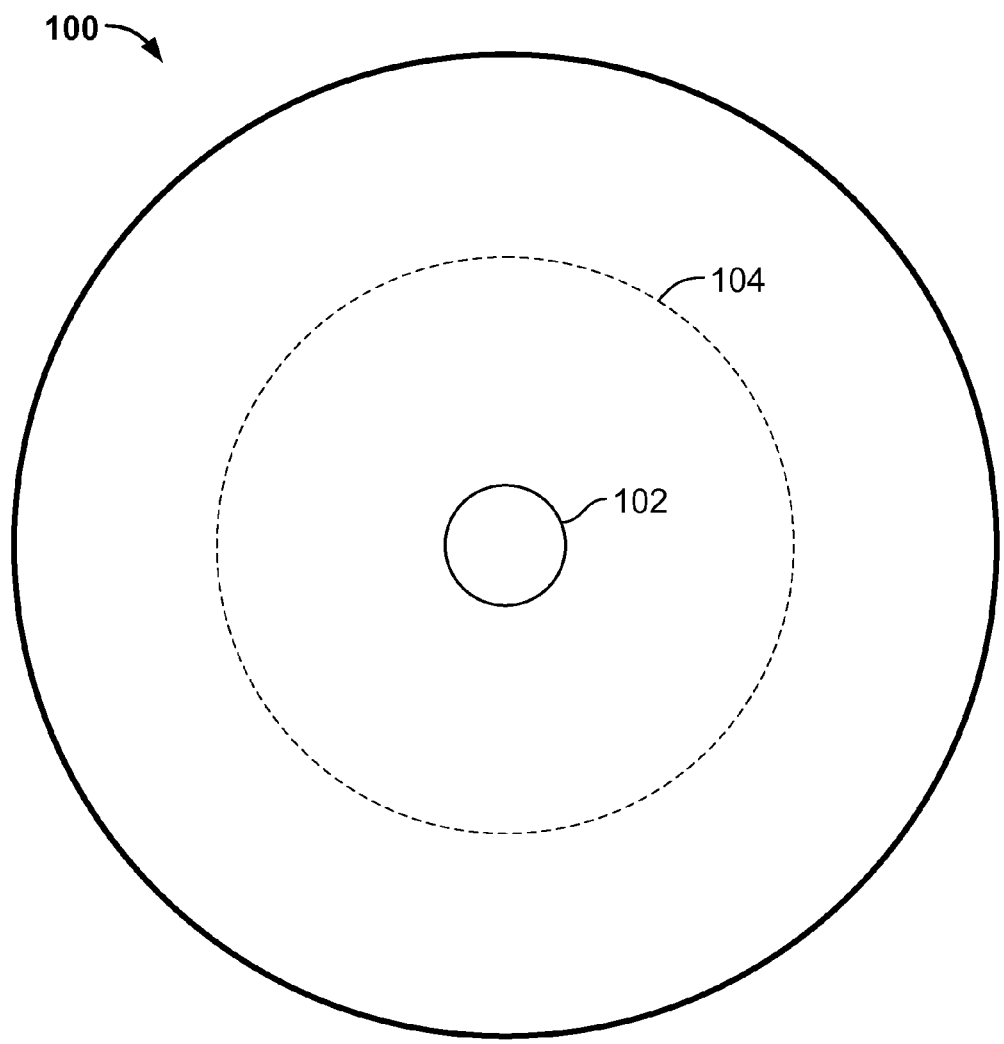
FIG. 1 is a diagram illustrating an example of a disk of a hard disk drive.

FIG. 1 is a diagram illustrating an example of a disk of a hard disk drive. In the example shown, disk 100 includes a spindle 102 around which the disk rotates. Disk 100 includes a plurality of concentric circular tracks to which data is written and from which data is read. Track 104 is an example of one of the concentric tracks.

Figure 2:
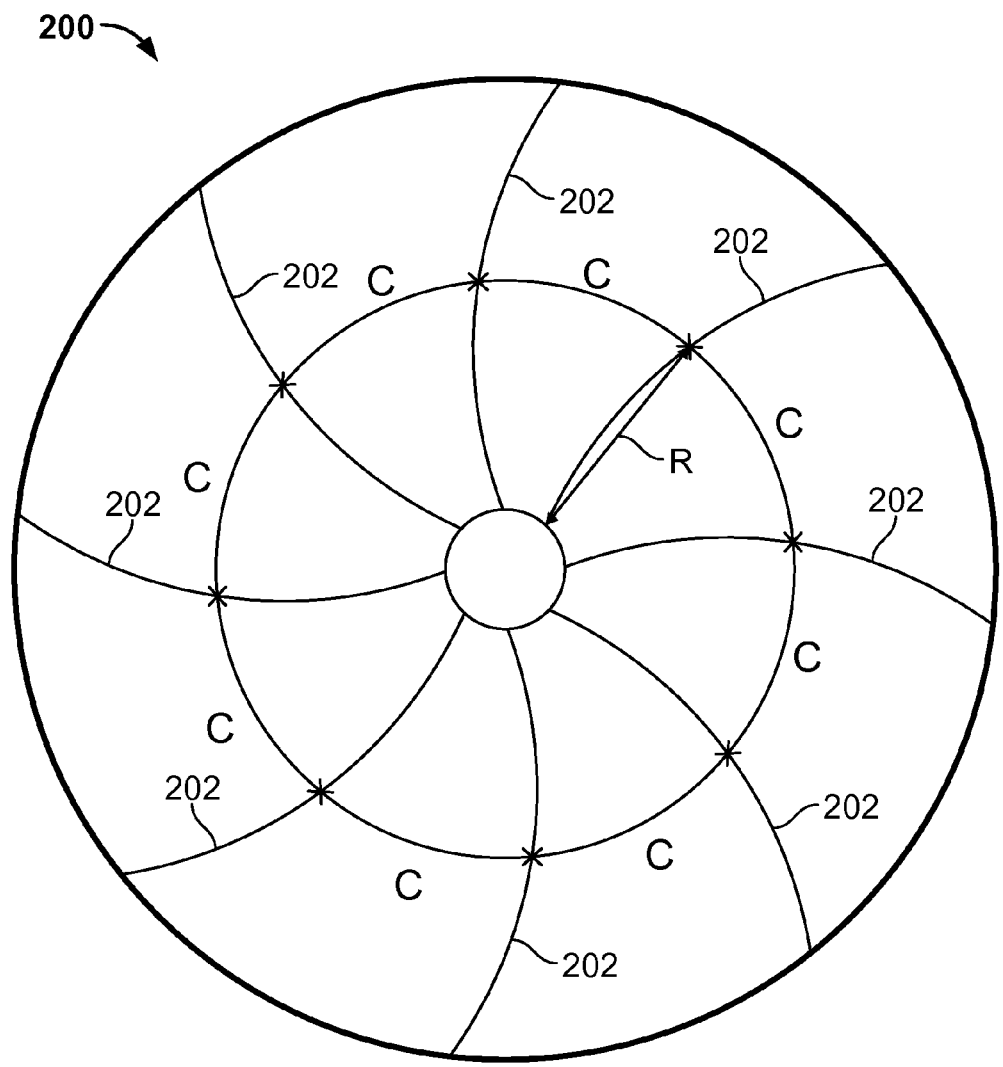
FIG. 2 is a diagram illustrating an example of servo code on a disk.

FIG. 2 is a diagram illustrating an example of servo code on a disk. In the example shown, disk 200 includes servo code written along arcs 202 that extend out radially from the center of disk 200 as shown. Arcs 202 are also referred to as servo wedges 202 because they divide the disk into (curved) wedges. Servo wedges 202 are tangentially/circumferentially equidistant from each other. For example, at any radius R from the center of disk 200, the servo wedges are spaced apart by a circumferential distance C. (A circumferential or tangential distance is the distance along the circumference of a circle centered on the disk). For clarity, the examples herein show 8 servo wedges per disk. However, these examples can be extended to any number of servo wedges per disk.

It is important for servo wedges 202 to be written at precise locations on the disk because servo wedges 202 are used to position the read/write heads of the disk. To accomplish this, during the servo writing process, the position of the write head must be carefully controlled both in the radial and tangential directions. In other words, if the design is for the servo wedges to be placed as shown in disk 200, then at every radial distance R, the servo wedges should be spaced apart by an exact circumferential distance C (within an acceptable margin of error).

In some systems, special servo writer hardware is used, which is time consuming and expensive. In other systems, an embedded system-on-a-chip (SoC) is configured to write servo code to the disk during manufacturing. In such systems, each disk can write its own servo, so this procedure is referred to as self servo write (SSW). Some SSW systems require a complicated feedforward mechanism, do not have high error tolerance in the position of the spiral waveform on the disk, and/or require prewritten seed servo wedges. In some embodiments, the techniques disclosed herein do not have the above drawbacks. For example, the disclosed techniques may be used with or without prewritten servo wedges (seed servo wedges).

In some embodiments, the disclosed techniques require that the head be centered on the track (i.e., the radial position of the head is controlled). In various embodiments, this can be accomplished using techniques such as seed servo wedges or using the amplitude and location of detected sync marks in the SSW spiral waveform, described below.

Figure 3:
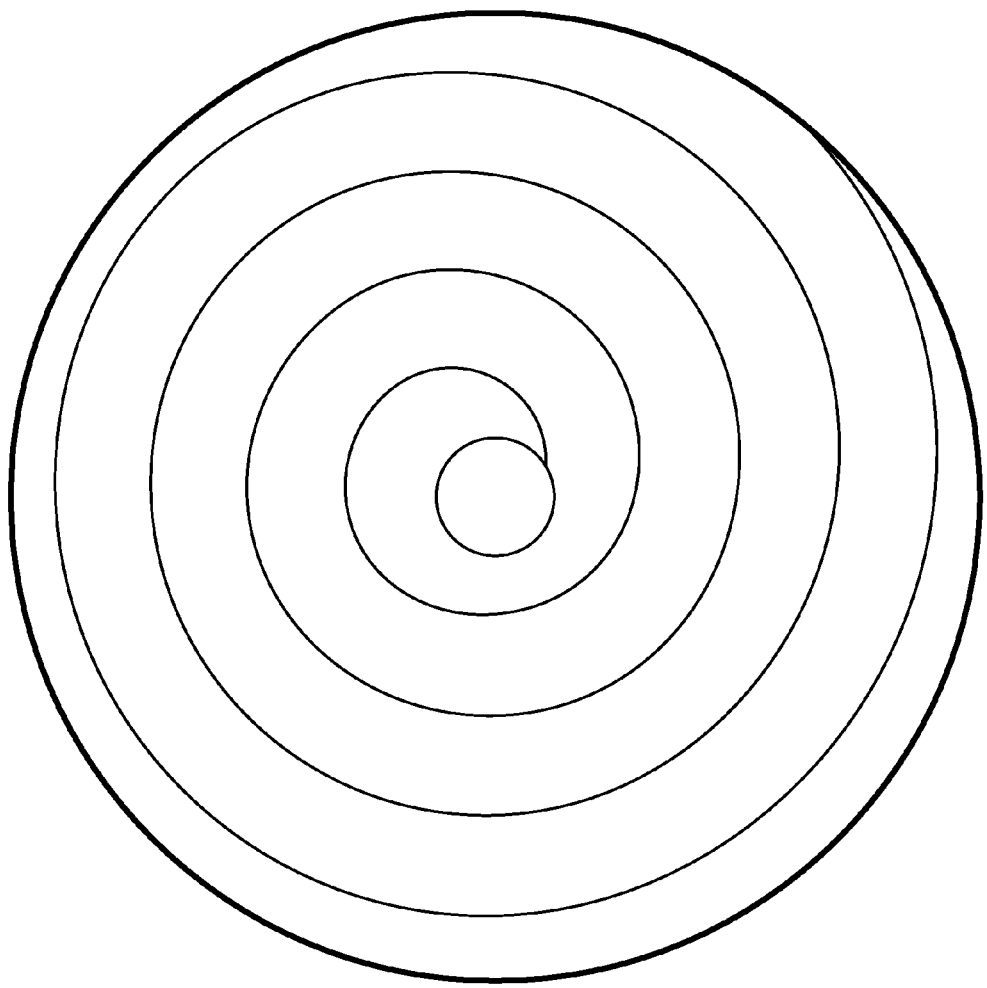
FIG. 3 is a diagram illustrating an example of a spiral waveform written to a disk.

FIG. 3 is a diagram illustrating an example of a spiral waveform written to a disk. In some SSW systems, prior to servo writing, a waveform is written to the disk in a spiral pattern, resulting in a spiral waveform. The purpose of the spiral waveform is to correctly position the servo wedges written to the disk, as will be more fully described below.

In some embodiments, the waveform in the spiral waveform comprises a repeating pattern. In some embodiments, the repeating pattern comprises a preamble pattern (which appears as a sine-wave when read off the disk) followed by a sync mark pattern. Therefore, the sync mark pattern repeats at regular intervals in the waveform.

In some SSW systems, the spiral waveform must be precisely located in order to be effectively used to write servo to the disk. However, in the techniques disclosed herein, the spiral waveform is not required to be precisely located in order to yield good results (e.g., a precisely located servo wedge with an acceptable margin of error).

Figure 4:
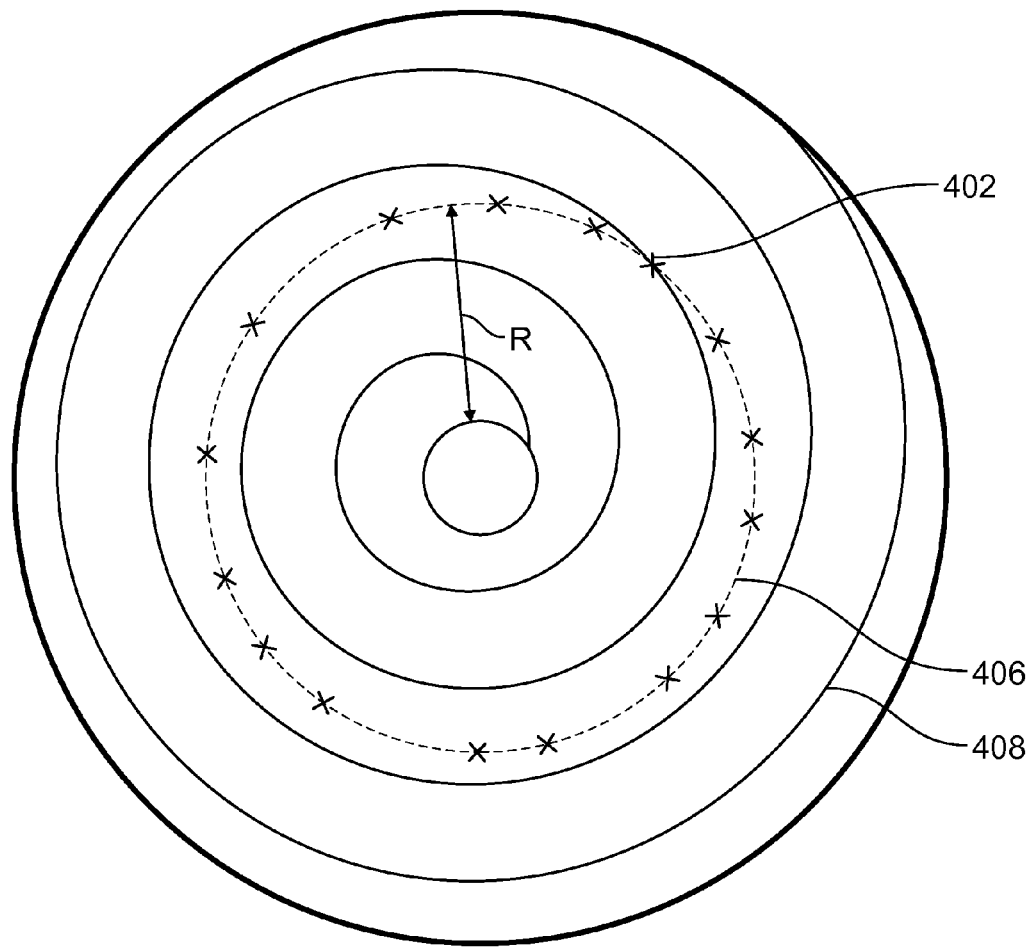
FIG. 4 is a diagram illustrating an example of a spiral waveform written to a disk and a track on the disk.

FIG. 4 is a diagram illustrating an example of a spiral waveform written to a disk and a track on the disk. 8 servo wedges are to be written in this example. In this example, the read head is currently positioned/spinning above track 406 at radius R. As shown, the track intersects the spiral waveform 408 at exactly one location (at the point where the spiral waveform has radius R), intersection 402.

In some embodiments, more than one spiral waveform (e.g., of different sizes) is written to the disk, which assists with servo writing. In some embodiments, two spiral waveforms are written per servo wedge to be written to the disk.

For example, if there are $N_{wedge}$ servo wedges, then $2N_{wedge}$ spiral waveforms are written. This means there will be two intersections of the track with two spiral waveforms per wedge. The spiral waveforms do not need to be evenly spaced from each other.

In the example shown, there are 8 servo wedges to be written, so 16 spiral waveforms would be written (or 15 additional spiral waveforms would be written in addition to the one shown). For clarity, only one spiral waveform is shown; however, the intersections of the track with the 16 spiral waveforms are indicated by X marks. The X marks do not need to be evenly spaced from each other.

Figure 5:
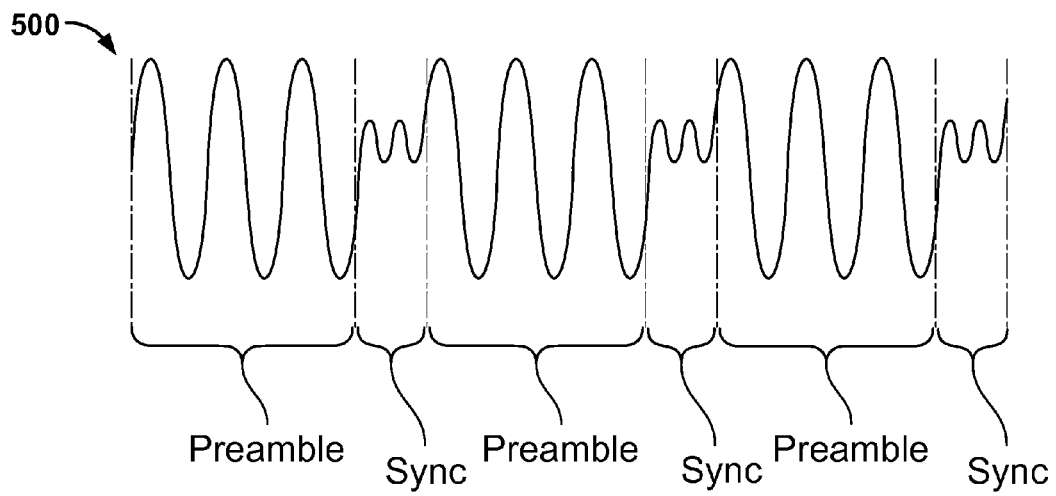
FIG. 5 is an example of a waveform used to create a spiral waveform in some embodiments.

FIG. 5 is an example of a waveform used to create a spiral waveform in some embodiments. As shown, waveform 500 comprises a repeating pattern of a preamble followed by a sync portion.

Figure 6:
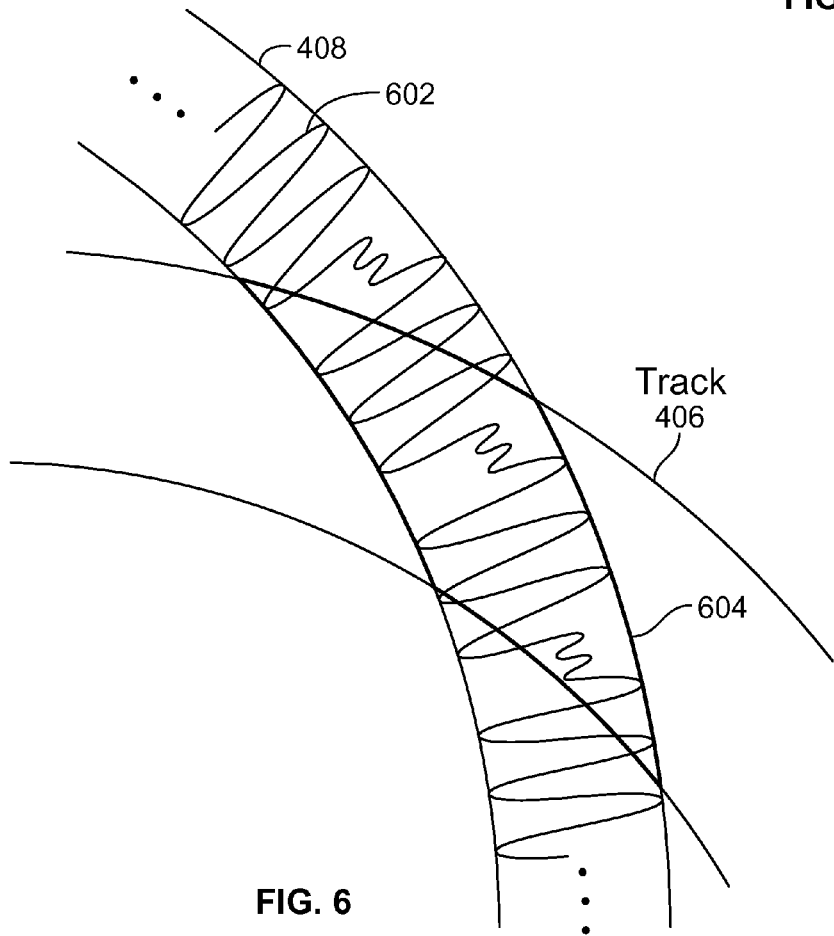
FIG. 6 is an example of an intersection of a spiral waveform with a track on a disk.

FIG. 6 is an example of an intersection of a spiral waveform with a track on a disk. In some embodiments, this diagram is an enlargement of the region corresponding to intersection 402 from FIG. 4. In this example, waveform 500 is applied to spiral pattern 408, creating spiral waveform 602. The intersection of spiral waveform 602 with track 406 yields a curved diamond shaped overlapping region 604. In this example, region 604 includes 3 sync mark patterns.

Figure 7:
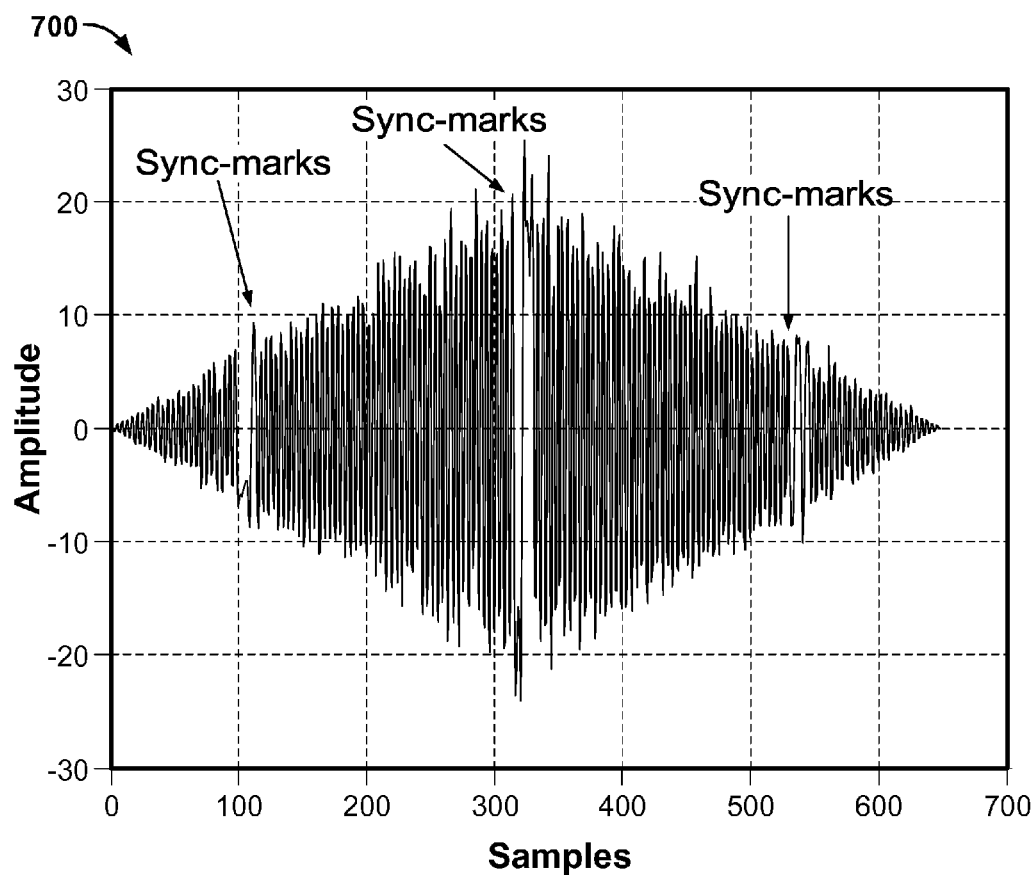
FIG. 7 is an example of the waveform read from a track where the track intersects with a spiral waveform.

FIG. 7 is an example of the waveform read from a track where the track intersects with a spiral waveform. For example, this waveform corresponds to a region such as region 604. Due to the angle at which the read head cuts through the spiral waveform, when the spiral waveform is read from the track, the read back wave form will have an envelope that is shaped like a diamond (or whatever the shape of the intersection is). As used herein, "spiral segment" refers to the read back waveform in the region where the spiral waveform intersects with the track on the disk. In this example, there are three sync mark portions within the spiral segment.

In some embodiments, there are at least one (or two) spiral segments per wedge to be written. In some embodiments, within each spiral segment, there is at least one detectable sync mark.

Figure 8:
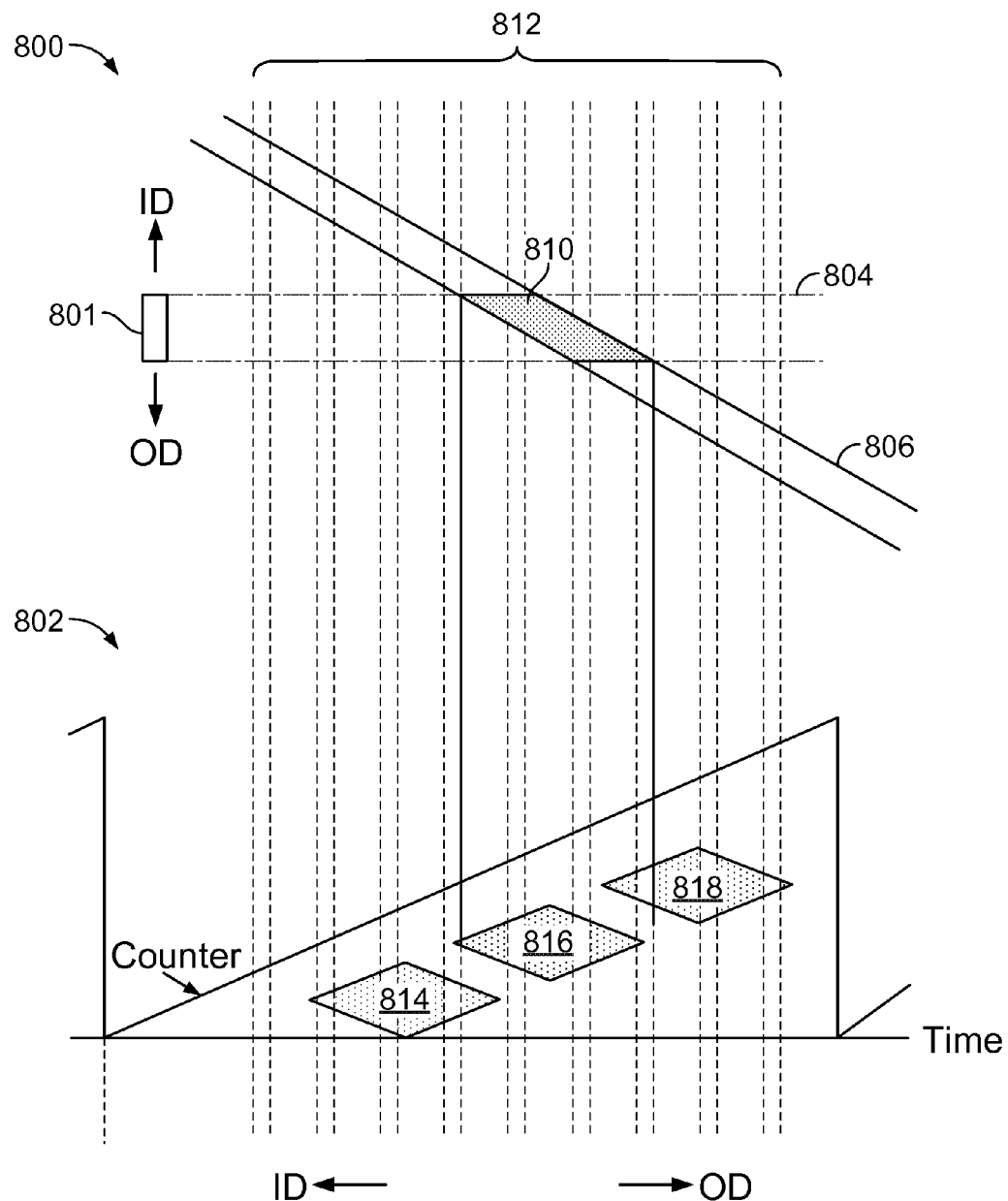
FIG. 8 is an example illustrating a conceptual diagram of a read back waveform from a read head hovering at a fixed radius (track) over a rotating disk over one revolution.

FIG. 8 is an example illustrating a conceptual diagram of a read back waveform from a read head hovering at various radial positions over a rotating disk.

In some embodiments, the SSW system uses a clock to write servo wedges. In some embodiments, the clock is a modulo counter (e.g., it counts from 0 to $N_{clock}$ and then resets to 0 and repeats). The modulo counter value is shown in diagram 802 as "counter". In the example shown, the modulo counter is configured to reset to 0 after counting the length of one wedge-to-wedge time interval, where one wedge-to-wedge time interval is the time it takes for the head to go from one wedge to the next. For example, in FIG. 2, there are 8 wedges evenly spaced circumferentially around the disk. Therefore, there would be 8 wedge-to-wedge time intervals. On each revolution, the sync mark patterns remain at the same position within a wedge-to-wedge time interval, with respect to the clock.

In the example shown, diagram 800 shows a read head 801 on a track 804. Track 804 intersects a spiral waveform 806 at spiral segment 810 (the shaded diamond). The y-axis is the radial head position of read head 801, with the upward direction being towards the inner diameter (ID) of the disk, and the downward direction being towards the outer diameter (OD) of the disk. Therefore, when read head 801 shifts upwards, its radial position is moving towards the ID. When the read head 801 shifts downwards, its radial position is moving towards the OD. As previously described, spiral waveform 806 comprises a repeating pattern comprising a preamble pattern followed by a sync mark pattern. In this diagram, the repeating sync mark pattern 812 is indicated by dashed lines. For example, spiral segment 810 includes three sync mark patterns.

In diagram 802, the y-axis is the amplitude of the read back waveform from read head 801 (and counter count, as more fully described below). The x-axis is time. Diagram 802 shows three spiral segments 814, 816, and 818. Spiral segment 816 corresponds to spiral segment 810; the left and right hand endpoints of spiral segment 816 can be traced up to spiral segment 810 in diagram 800, as shown by the bold lines. Spiral segment 814 shows what would be read back if read head 801 were to move towards the ID. Spiral segment 818 shows what would be read back if read head 801 were to move towards the OD. In other words, spiral segment 816 shifts left (down in time) when read head 801 moves towards the ID and shifts right (up in time) when read head 801 moves towards the OD. For purposes of illustration, spiral segments 814, 816, and 818 are shown as shifted up and down from each other so that they do not overlap.

This is the convention used in this diagram. In other embodiments, the convention may be different. For example, in some embodiments, shifting the read head towards the ID may shift the spiral segment to the right (up in time).

Each spiral segment 814, 816, and 818 has sync mark patterns at locations that correspond to sync mark patterns 812 in spiral waveform 806. As shown, although the spiral segments may shift left or right as the read head radial position shifts towards the ID or the OD, the sync mark patterns remain fixed within the wedge-to-wedge time interval, with respect to the clock.

Figure 9:
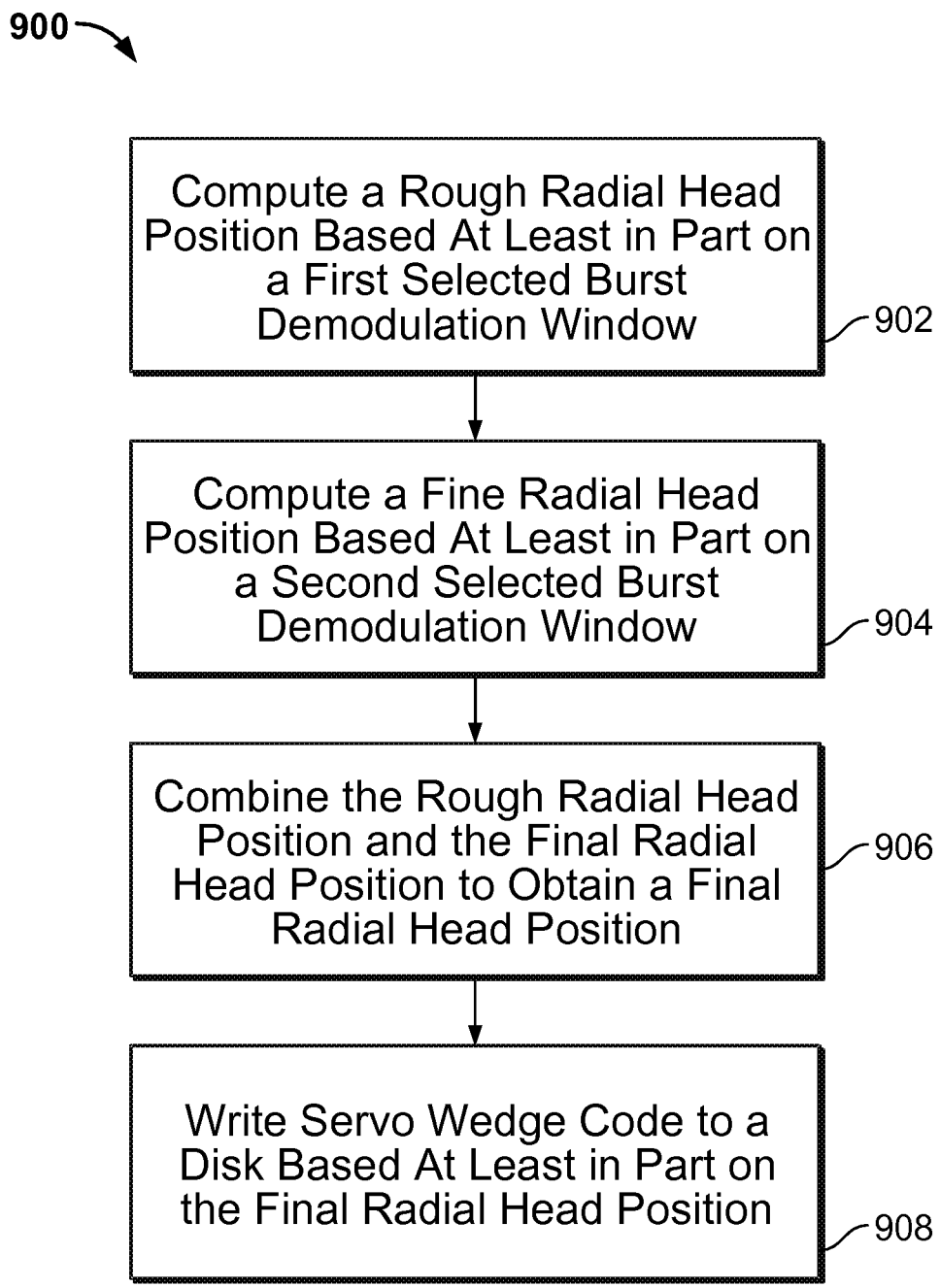
FIG. 9 is a flow chart illustrating an embodiment of a process for determining a radial head position.

FIG. 9 is a flow chart illustrating an embodiment of a process for determining a radial head position.

At 902, a rough radial head position is computed based at least in part on a first selected burst demodulation window (BDW).

At 904, a fine radial head position is computed based at least in part on a second selected burst demodulation window.

At 906, the rough radial head position and the final radial head position are combined to obtain a final radial head position.

At 908, servo wedge code is written to a disk based at least in part on the final radial head position.

Figure 10:
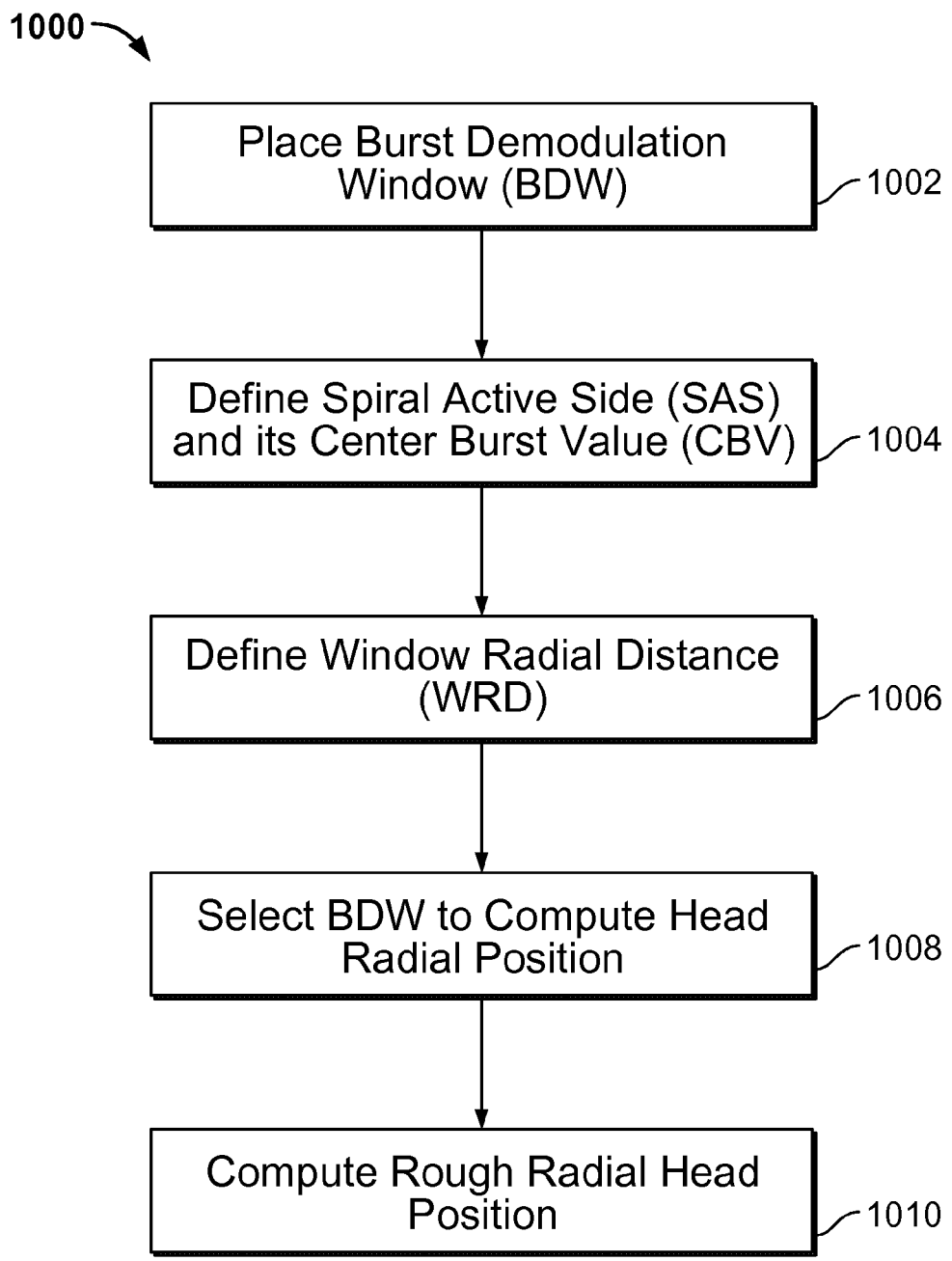
FIG. 10 is a flow chart illustrating an embodiment of a process for computing a rough radial head position.

FIG. 10 is a flow chart illustrating an embodiment of a process for computing a rough radial head position. In some embodiments, process 1000 is used to perform 902.

At 1002, a series of burst demodulation windows are placed. Momentarily turn aside to FIG. 11.

Figure 11:
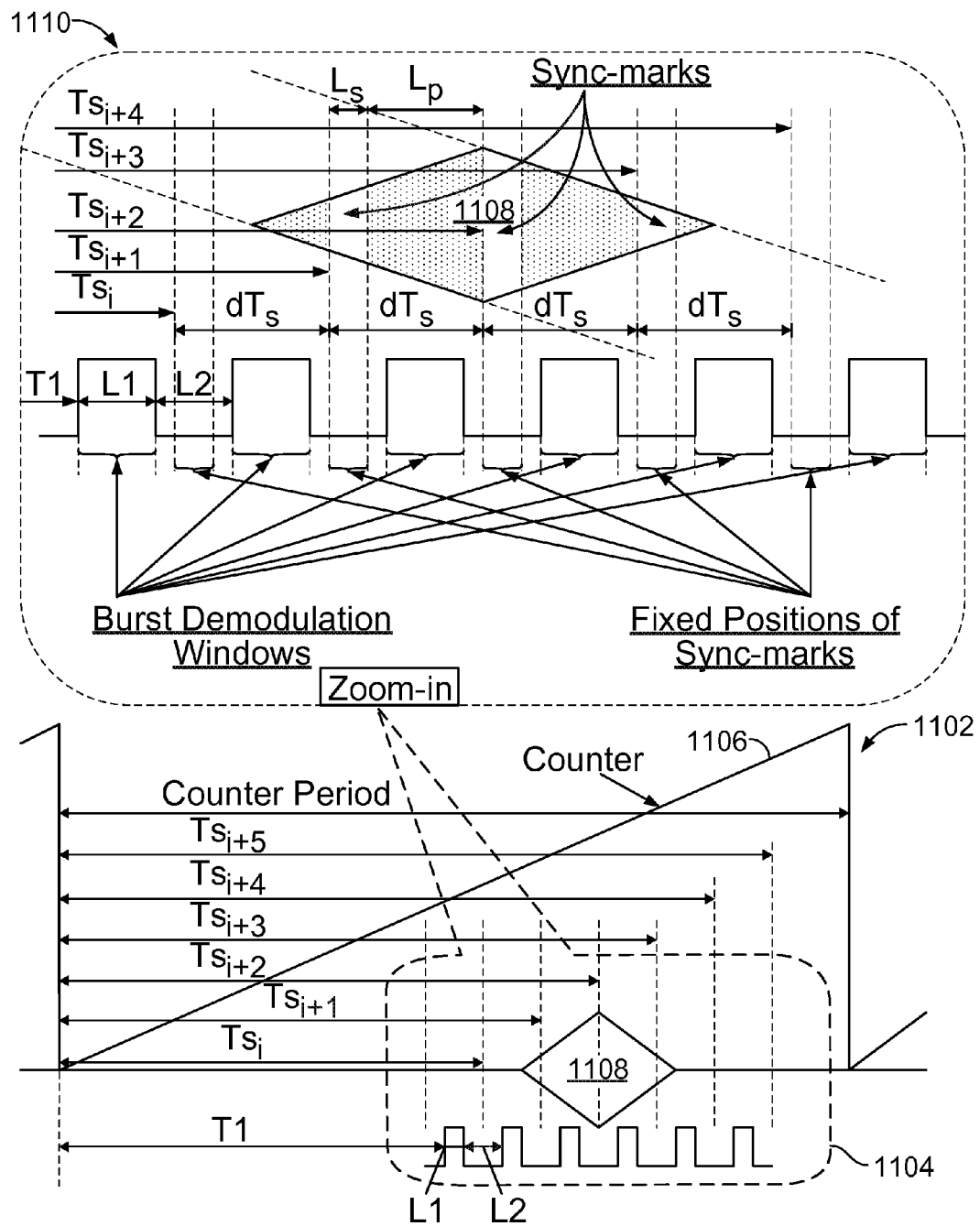
FIG. 11 is an example illustrating a conceptual diagram of a read back waveform from a read head hovering at a particular radial position over a rotating disk over one wedge-to-wedge time interval.

FIG. 11 is an example illustrating a conceptual diagram of a read back waveform from a read head hovering at a particular radial position over a rotating disk over one wedge-to-wedge time interval.

Diagram 1102 shows a counter 1106 counting from 0 to $N_{clock}$ and then resetting to 0. On the same plot, a spiral segment 1108 is shown. Sync mark patterns are periodic in the spiral waveform and are labeled at $Ts_i$ through $Ts_{i+5}$, though they are only read by the read head at spiral segment 1108. In various embodiments, there may be other spiral segments besides spiral segment 1108, but for simplicity, only spiral segment 1108 is shown in this example.

Diagram 1110 shows a blow up of box 1104. Diagram 1110 shows a distance dTs between the start of each sync mark pattern (also referred to herein as sync mark). Based on the position of at least one sync mark pattern, a window between each sync mark to sync mark interval is defined. The window is referred to herein as a burst demodulation window (BDW).

In some embodiments, the sum of the amplitude of the spiral segment inside a BDW is computed. This sum is referred to herein as a Spiral Burst Amplitude (SBA).

In some embodiments, the BDW width L1 is less than the length of the distance between two sync mark patterns to satisfy the constraint that the BDW does not include any sync mark pattern (i.e., the BDW only contains the preamble pattern). In some embodiments, the BDW is set as large as possible while satisfying this constraint. In some embodiments, the units of L1 is clock cycles. As such:

$$L1 = Lp - L0, L0 > 0$$

where Lp is the length of the spiral preamble between two consecutive sync marks in clock cycles and L0 is a positive number of clock cycles.

The BDW gap L2 is defined as the number of clock cycles between two consecutive BDWs such that:

$$L2 = (Ls + Lp) - L1$$

where Ls is the length of a sync mark pattern in clock cycles

In some embodiments, $L2 \geq Ls$ to satisfy the constraint that the BDW does not include any sync mark pattern.

In some embodiments, a Spiral Center Condition is satisfied. The Spiral Center Condition is satisfied when:

(1) The number Nd of BDWs is large enough to be able to capture the whole spiral segment in the middle of the series of BDWs when the head is standing still or moving in a radial direction; and (2) There is at least one BDW in front (before) and behind (after) the spiral segment.

The Spiral Center Condition is satisfied when:

$$Nd \times (Ls + Lp) \geq Lsp + 2 \times (Ls + Lp)$$

where Lsp is the length of the spiral segment in clock cycles.

In some embodiments, there are at least three BDWs placed. This is because three BDWs is the minimum number of BDWs in the series of BDWs required to satisfy the Spiral Center Condition.

From the desired number Nd of Burst Demodulation Windows and the "Spiral-Center Condition", the BDW Header T1 is defined as the starting point of the first BDW. T1 is defined from the position of one of the detected sync marks $Ts_d$ as follows:

$$T1 = Ts_d - (Ls + Lp) \times N$$

where $Ts_d$ is the position of one of the detected sync marks (the value of the counter when this sync mark is detected). N is a positive integer selected to satisfy "Spiral-Center Condition" when the total desired number of BDWs is Nd.

As the head moves in the radial position, the spiral segment position will keep changing. To keep satisfying the Spiral Center Condition with a limited number of Burst Demodulation Windows Nd, a replacement of the series of Burst Demodulation Windows will be required by changing the BDW Header T1 by a multiple of (Ls+Lp) while L1 and L2 are kept constant.

Turning back to FIG. 10, at 1004, Spiral Active Side (SAS) and its Center Burst Value (CBV) are defined. As shown in FIG. 7, the spiral segment has a diamond shaped envelope which is largest in the middle and becomes smaller gradually on both sides. In some embodiments, one side of the spiral is selected as the Spiral Active Side (SAS). In such embodiments, the SAS is either chosen as the left side (i.e., which corresponds to a smaller clock count), or as the right side (i.e., which corresponds to a larger clock count) of the peak of the spiral. Regardless of the selection, the SAS cannot be changed during the servo write operation. Momentarily turn aside to FIG. 12.

Figure 12:
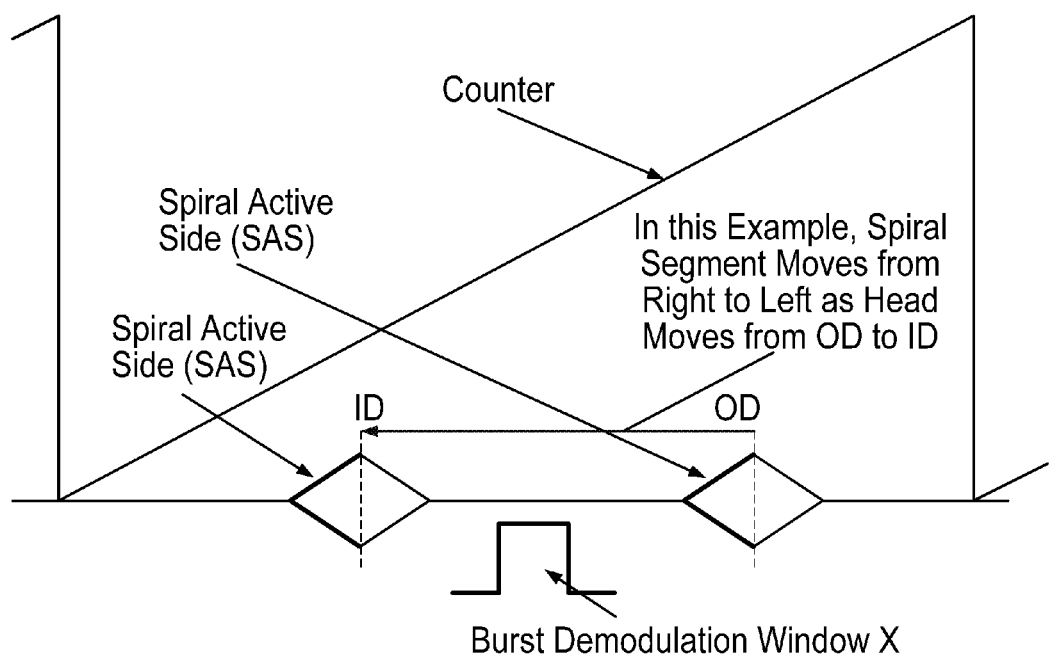
FIG. 12 is an example illustrating a selected Spiral Active Side.

FIG. 12 is an example illustrating a selected Spiral Active Side. In this example, the SAS is chosen as the left hand side of the spiral segment or the side where the clock counter value is smaller. In this example, as the head moves in the radial direction towards the ID, the position of the spiral segment shifts left (towards a small counter value).

Since BDWs are positioned with respect to a fixed reference (the counter), the spiral segment will move across a given BDW as the radial position of the head changes. As a result, the value of the SBA in a given BDW will change.

Figure 13:
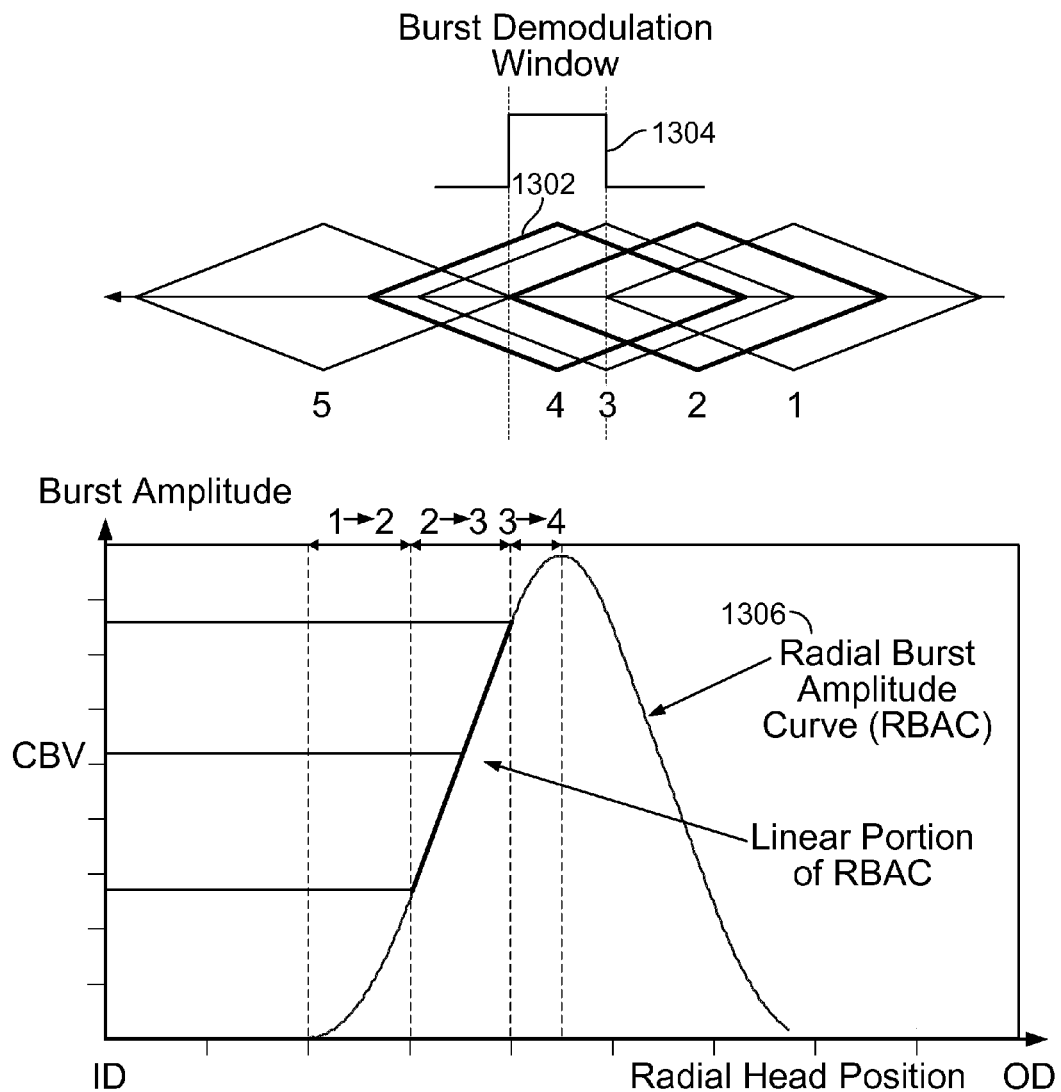
FIG. 13 shows an example of a spiral segment moving and its effect on the spiral burst amplitude (SBA) value for a single fixed BDW.

FIG. 13 shows an example of a spiral segment moving and its effect on the spiral burst amplitude (SBA) value for a single fixed BDW.

In this example, a spiral segment 1302 is shown for various radial head positions 1-5. There is a burst demodulation window 1304 positioned as shown. For spiral segment 1302 and BDW 1304, the plot below shows SBA 1306 versus radial head position. The points 1-4 on SBA 1306 indicate the SBA values for the various radial head positions 1-5. These values can be explained as follows, going from position 1 to position 5:

Prior to position 1, the Spiral Burst Amplitude is 0. This is because there is no overlap between BDW 1304 and spiral segment 1302 in position 1 or before (i.e., the spiral segment moving to the right of position 1).

As the spiral segment moves from position 1 to position 2, the Burst Demodulation Window partially overlaps the Burst Demodulation Window and, therefore, the Spiral Burst Amplitude increases nonlinearly (e.g., squared or other nonlinear function). As the spiral segment moves from position 2 to position 3, the Burst Demodulation Window completely overlaps one side of the spiral segment and, therefore, the Spiral Burst Amplitude increases linearly.

As the spiral segment moves from position 3 to position 4, the Burst Demodulation Window partially overlaps both sides of the spiral segment. The Spiral Burst Amplitude will, thus, increases nonlinearly (e.g., its gradient is less than linear derivative), and peaks when the Burst Demodulation Window is centered on the spiral (position 4)).

As the spiral segment moves from position 4 to 5, the Spiral Burst Amplitude will change similarly and in general, its profile has its peak amplitude in the middle. Here, we refer to this profile (as a function of radial head position) as the Radial Burst Amplitude Curve (RBAC).

In some embodiments, the Center Burst Value (CBV) is defined as the value of the center of the linear part of the slope corresponding to the Spiral Active Side (SAS) of the Radial Burst Amplitude Curve (RBAC).

For example, in FIG. 12, as the head moves from ID to OD, the spiral segment moves from a position where the counter value is small to a position where the counter value is larger. If Spiral Active Side (SAS) is selected as the side where the counter value is smaller (left side) then its corresponding slope on the RBAC is on the left hand side of the curve and the Spiral Burst Amplitude value at the center of the linear part of this slope is the Center Burst Value (CBV), as shown in FIG. 13.

In some embodiments, initially, the CBV can take a predefined fixed value which can be obtained from test experiment or design, or from a fixed ratio of the peak value of the RBAC, where the ratio is obtained from test experiment or design. Calibration of the CBV is discussed more fully below.

Returning to FIG. 10, at 1006, Window Radial Distance (WRD) is defined. Window Radial Distance (WRD) is the radial distance the head moves so that the spiral segment moves a distance equal to a Burst Demodulation Window period (L1+L2), or the same Spiral Burst Amplitude value is measured from a Burst Demodulation Window to an adjacent (in time) Burst Demodulation Window.

Initially, WRD can take a predefined fixed value obtained from a test experiment or a spiral wedge design.

The WRD value may vary depending on the angle between the read head track and the spiral waveform. In some cases, the spiral waveform is not written such that the angle remains constant on the disk at different radial head positions, e.g., because the velocity of he head is smaller at the beginning and the end of the process to write the spiral waveform. In such cases, the WRD value may change as the head travels from the ID to the OD areas of the disk. In this case, WRD may need to be calibrated as a function of the head position, as discussed more fully below.

At 1008, BDWs are selected to compute head radial position. In some embodiments, from the series of Burst Demodulation Windows placed at 1002, two Burst Demodulation Windows are selected based at least in part on the position of the spiral segment in relation to the Burst Demodulation Windows. In some embodiments, the two Burst Demodulation Windows are selected based at least in part on the Spiral Active Side (SAS) of the spiral segment and the value of the Spiral Burst Amplitudes in those windows. In some embodiments, the two BDWs are the two BDWs corresponding to the two SBAs closest to the CBV, on either side or equal to the CBV. An example of this is shown in FIG. 14.

Figure 14:
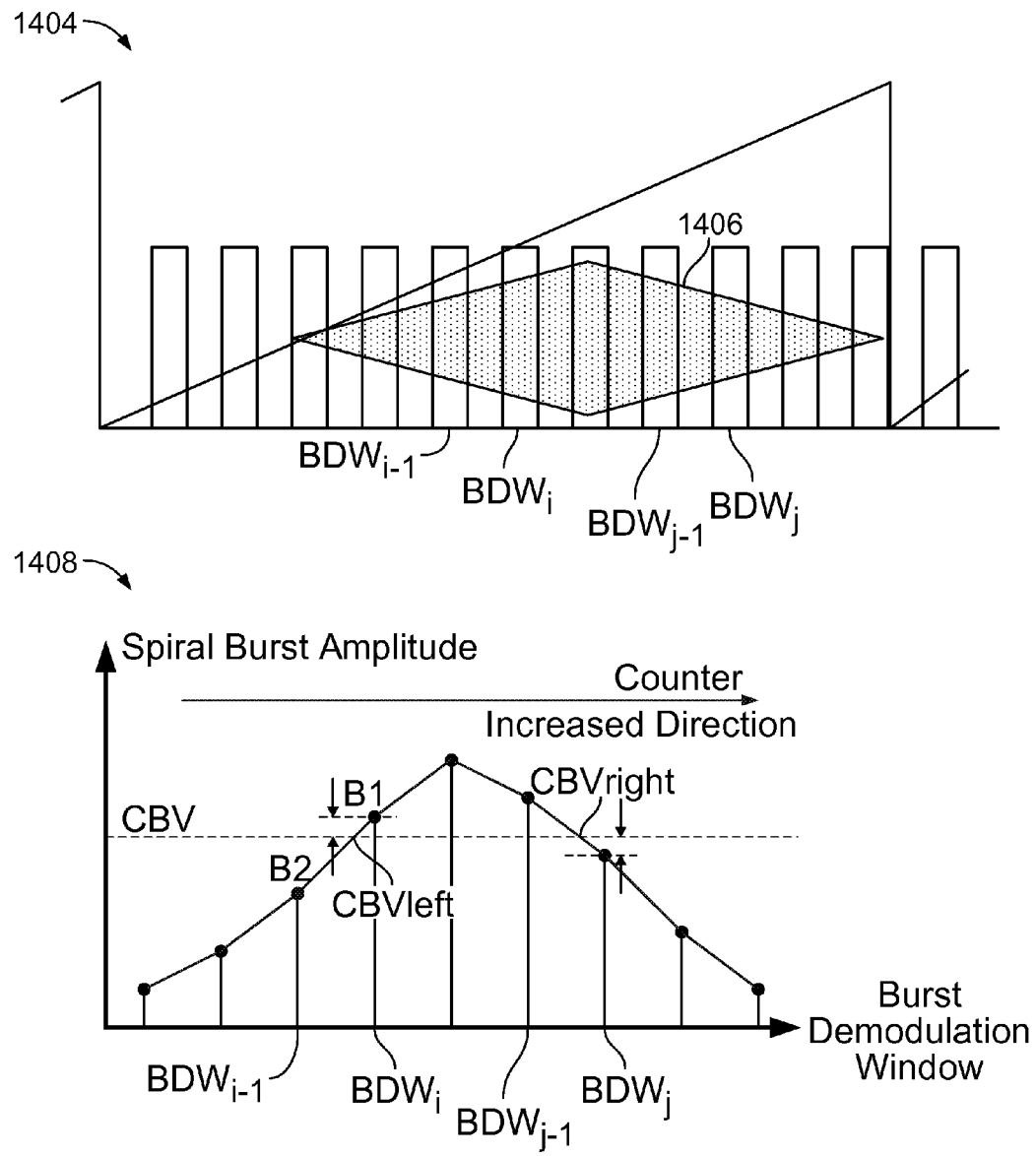
FIG. 14 shows an example of selecting two BDWs to compute head radial position.

FIG. 14 shows an example of selecting two BDWs to compute head radial position. Diagram 1404 shows a fixed spiral segment 1406 and a series of burst demodulation windows (e.g., selected at 1102), including $BDW_{i-1}$, $BDW_i$, ..., $BDW_{j-1}$, $BDW_j$. Diagram 1408 shows SBAs for each of the BDWs. For example, for $BDW_i$, B1 in diagram 1408 is the sum of the amplitude of the spiral segment 1406 inside the window $BDW_i$ in diagram 1404. The CBV is shown in this plot. If the SAS is on the side of the spiral segment where the counter value is smaller (i.e., the left side), the CBV is CBVleft. If the SAS is on the side of the spiral segment where the counter value is bigger (i.e., the right side), the CBV is CBVright. If the SAS is the side where the counter value is smaller, then the first Selected Burst Demodulation Window is $BDW_i$ and the second Selected Burst Demodulation Window is $BDW_{i-1}$. This is because $BDW_i$ and $BDW_{i-1}$ are the two closest points to CBVleft where $BDW_i$ and $BDW_{i-1}$ are on opposite sides of CBVleft. If SAS is the side where the counter value is larger, then the First Selected Burst Demodulation Window is $BDW_j$ and the Second Selected Burst Demodulation Window is $BDW_{j-1}$. This is because $BDW_j$ and $BDW_{j-1}$ are the two closest points to CBVright where $BDW_j$ and $BDW_{j-1}$ are on opposite sides of CBVright.

Figure 15:
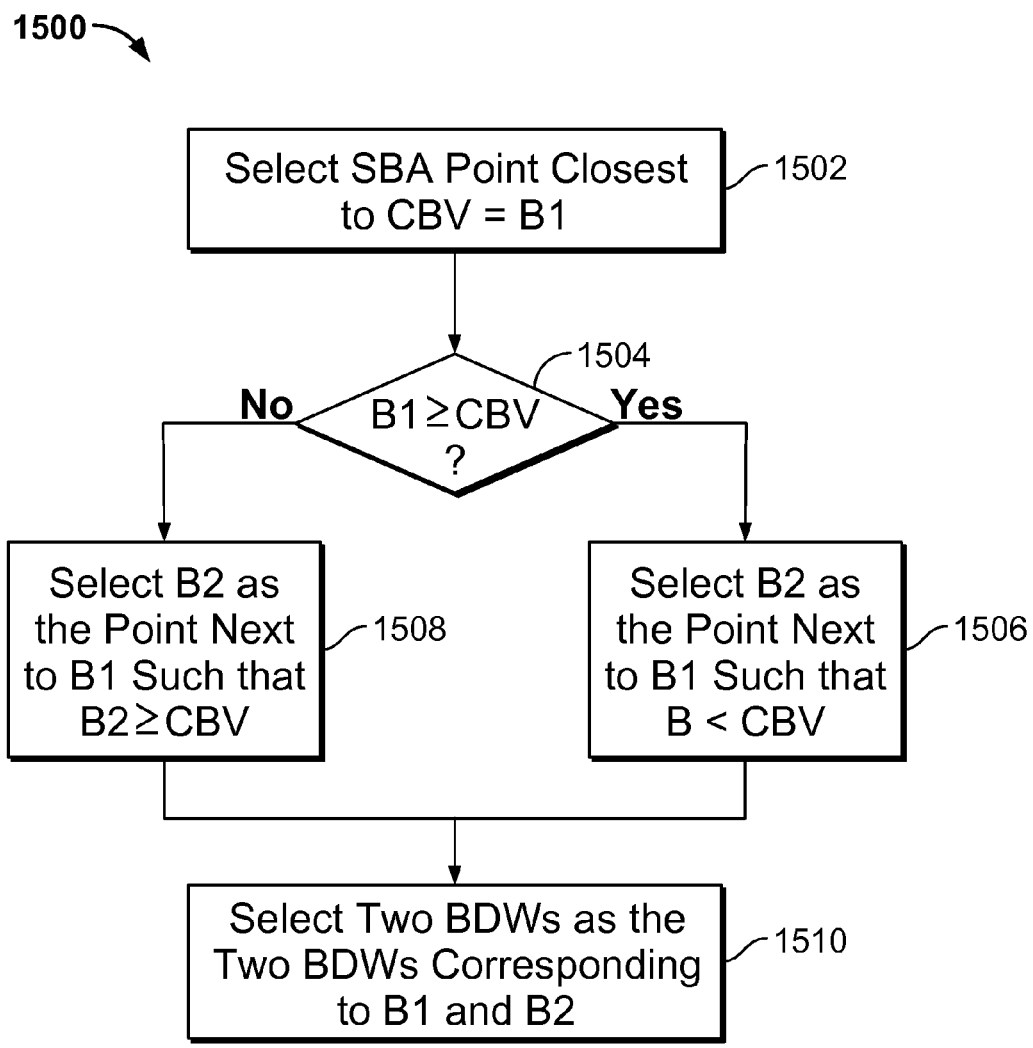
FIG. 15 is a flow chart illustrating an embodiment of a process for selecting two BDWs to compute radial head position.

FIG. 15 is a flow chart illustrating an embodiment of a process for selecting two BDWs to compute radial head position. In some embodiments, this process is used to select two BDWs, as illustrated in FIG. 14.

At 1502, the SBA point closest to the CBV is selected. Call that point B1. For example, in diagram 1408, if the SAS is the left side, the CBV is CBVleft. B1 is closest to CBVleft.

At 1504, it is determined whether B1≧CBV. In the above example, B1 is greater than CBVleft.

If B1≧CBV, then at 1506, B2 is selected as the point next to B1 and B2<CBV. In the above example, B2 is the point next to B1 that is less than CBVleft.

If B1<CBV, then at 1508, B2 is selected as the point next to B1 and B2≧CBV.

At 1510, the two BDWs are selected as the two BDWs corresponding to B1 and B2. In the above example, the two BDWs corresponding to B1 and B2 are BDW$_i$ and BDW$_{i-1}$, respectively.

In various embodiments, B1 and B2 may be defined differently. For example, ≧ may be swapped with > and < may be swapped with ≦ in the above flow chart in some other embodiments.

Returning to FIG. 10, at 1010, a rough radial head position is computed.

In some embodiments, the rough radial head position is computed from the first Selected Burst Demodulation Window as follows:

As described above, all Burst Demodulation Windows are separated by a gap of length L2. Assume that, for a counter period, there are a total of n Burst Demodulation Windows BDW$_1$, BDW$_2$ ..., BDW$_n$ covering the distance of a counter period from where the counter value is zero (BDW1) up to where counter value reaches its max value (BDW$_n$). Also assume that all windows satisfy the condition that all of the possible positions of sync marks of spiral segments lie within the length L2 gaps between consecutive Burst Demodulation Windows.

Then the rough radial position Pr of the head when the first selected Burst Demodulation Window is at Window BDW$_i$ (1≦i≦n) is computed as:

$$Pr = signRAD \times signSPI \times i \times WRD + Po, \text{ with } 1 \leq i \leq n$$

where:
i is the index of the first selected burst demodulation window

Po is a constant value such that when the radial head position is equal to zero then if the first Selected Burst Demodulation Window is at Window BDWz then $$Po = -signRAD \times signSPI \times z \times WRD$$

In some embodiments, for simplicity, for the first spiral segment, Po can be just simply defined as zero. The remaining parameters are defined as follows:

signRAD: is called radial sign. It is 1 if the radial head position (Pr) is defined such that its value will increase when the head moves towards the ID, otherwise signRAD is −1. In the examples, herein, we define the head position as increasing with movement towards the ID, so signRAD=1.

signSPI: is called spiral sign. If, when the head moves towards the ID (and the spiral segment is still within one counter period) the spiral segment moves from a position with a smaller counter value to a position with larger counter value, then signSPI is 1, otherwise signSPI is −1. In the examples given in FIGS. 12 and 13, as the head moves towards the ID, the spiral moves from a larger modulo count to a smaller modulo count (i.e., to the left) and, therefore, signSPI=−1.

The above convention is used in this embodiment. In various embodiments, other conventions may be used. For example, 1 and −1 may be swapped in the definition of sign-RAD and/or signSPI. The definition should be consistent throughout the computation of the radial position.

Figure 16:
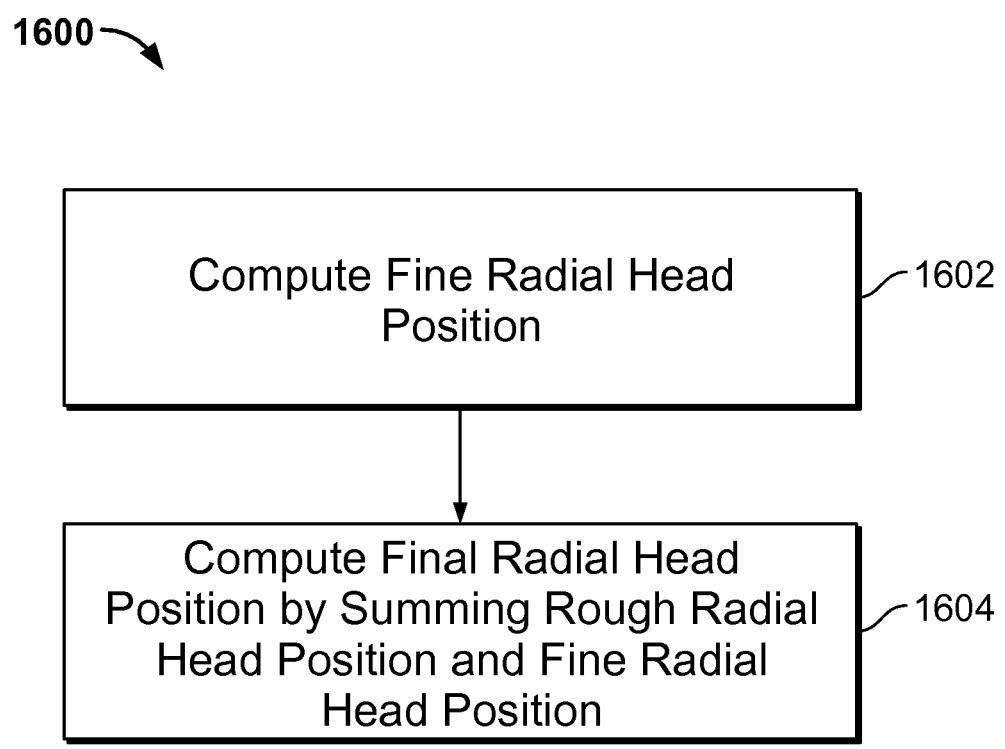
FIG. 16 is a flow chart illustrating an embodiment of a process for computing a final radial head position.

FIG. 16 is a flow chart illustrating an embodiment of a process for computing a final radial head position. In some embodiments, process 1600 is used to perform 904 and 906.

At 1602, a fine radial head position is computed.

In some embodiments, the fine head radial position Pf is computed from the First Selected Burst Demodulation Window and the Second Selected Burst Demodulation Window, as follows:

$$Pf = signRAD \times signSPI \times signSAS \times \frac{(B1-CBV)}{|B1-B2|} \times WRD$$

where:
B1 is the Burst Amplitude of the First Selected Burst Demodulation Window and B2 is the Burst Amplitude of the Second Selected Burst Demodulation Window and |B1−B2| is the absolute value of (B1−B2).

signSAS is the Spiral Active Side sign. The value of sign-SAS depends on the choice of the SAS and the movement of the spirals as the head moves towards the ID. SignSAS is 1 if the SAS is selected such that, as the head moves towards the ID, the SAS will meet any Burst Demodulation Window before the other side of Radial Burst Amplitude Curve meets this same window, otherwise signSAS is −1. In the example of FIG. 12, as the head moves towards the ID, the spiral segment moves to the left. Since the SAS was chosen as the left side of the spiral segment, signSAS=1.

In other words, signSAS is 1 when the SAS is the left side of the spiral segment and sign SAS is 1 when the SAS is the right side of the spiral segment.

In some other embodiments, signSAS may be defined differently. For example 1 and −1 may be swapped. The definition chosen should be consistent throughout the computation of the radial position.

At 1604, a final radial head position is computed by summing the rough radial head position and the fine radial head position.

In some embodiments, the final head radial position Pfinal is computed as follows:

$$Pfinal = Pr + Pf$$

where Pr is the rough head radial position and Pf is the fine head radial position. In other embodiments, the final radial head position and the rough radial head position are combined in other ways.

Figure 17:
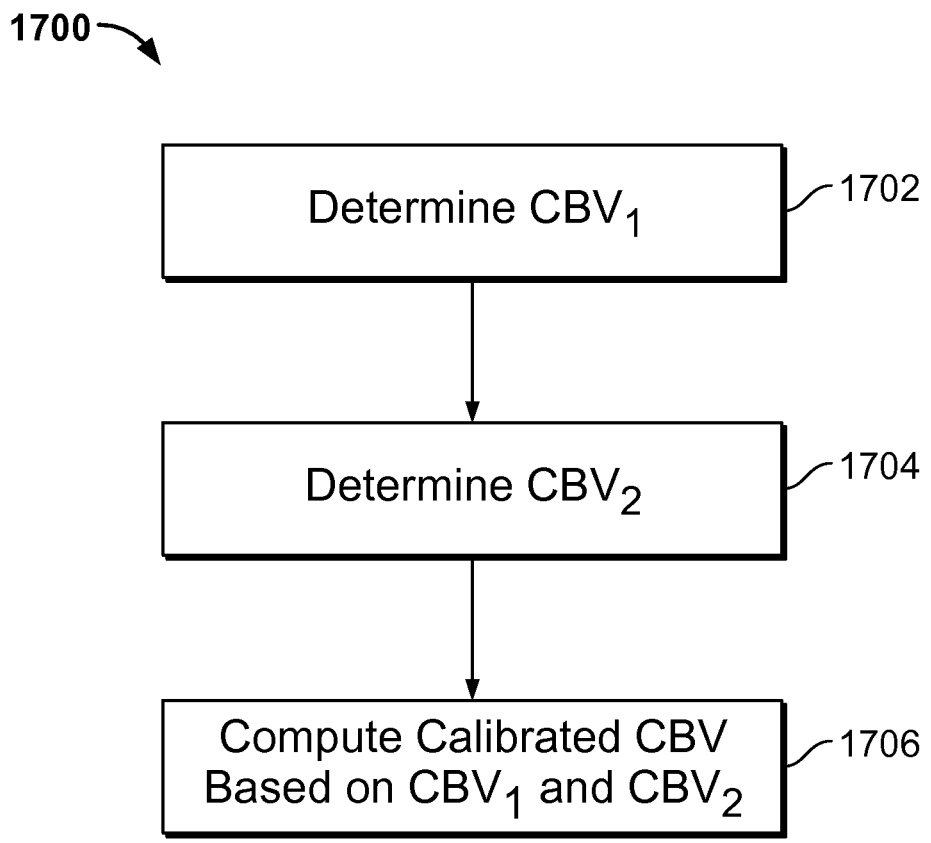
FIG. 17 is a flow chart illustrating an embodiment of a process for calibrating the CBV.

FIG. 17 is a flow chart illustrating an embodiment of a process for calibrating the CBV. The CBV depends on the radial burst amplitude curve, which could vary depending on a variety of factors. For example, one factor is the angle between the spiral waveform and the head tangential direction or its radial direction. A bigger angle yields a smaller spiral segment envelope (diamond), which decreases the CBV. A smaller angle yields a bigger spiral segment envelope, which increases the CBV. Another factor that affects the CBV is the read head size. In some cases, one disk could have multiple heads (e.g., four heads) of different sizes. A bigger head size yields a bigger spiral segment envelope, which decreases the CBV. A smaller head size yields a bigger spiral segment envelope, which increases the CBV.

In some embodiments, when the CBV is calibrated correctly, as the spiral segment moves across a Burst Demodulation Window or the head moves a WRD radial amount, the radial position of the head Pfinal will linearly change without any significant (e.g., discontinuous) jump in value. If the CBV is not calibrated correctly, there may be a discontinuity due to the absolute value of B1-B2 in the denominator of the formula for Pf. In some embodiments, the CBV can be calibrated based on this characteristic.

At 1702, CBV1 is determined, as described more fully below. At 1704, CBV2 is determined, as described more fully below.

At 1706, a calibrated CBV is computed based at least in part on CBV1 and CBV2. In some embodiments, the calibrated CBV is the average of CBV1 and CBV2:

$$CBV = \frac{CBV1 + CBV2}{2}$$

In some embodiments, the calibrated CBV can be used for all spiral segments at all head radial positions.

In some embodiments, a table of CBV values is stored for different radial position regions and/or different head sizes. For example, there may be six different combinations of radial position regions and head sizes (and this process is performed for each region to obtain a CBV).

Figure 18:
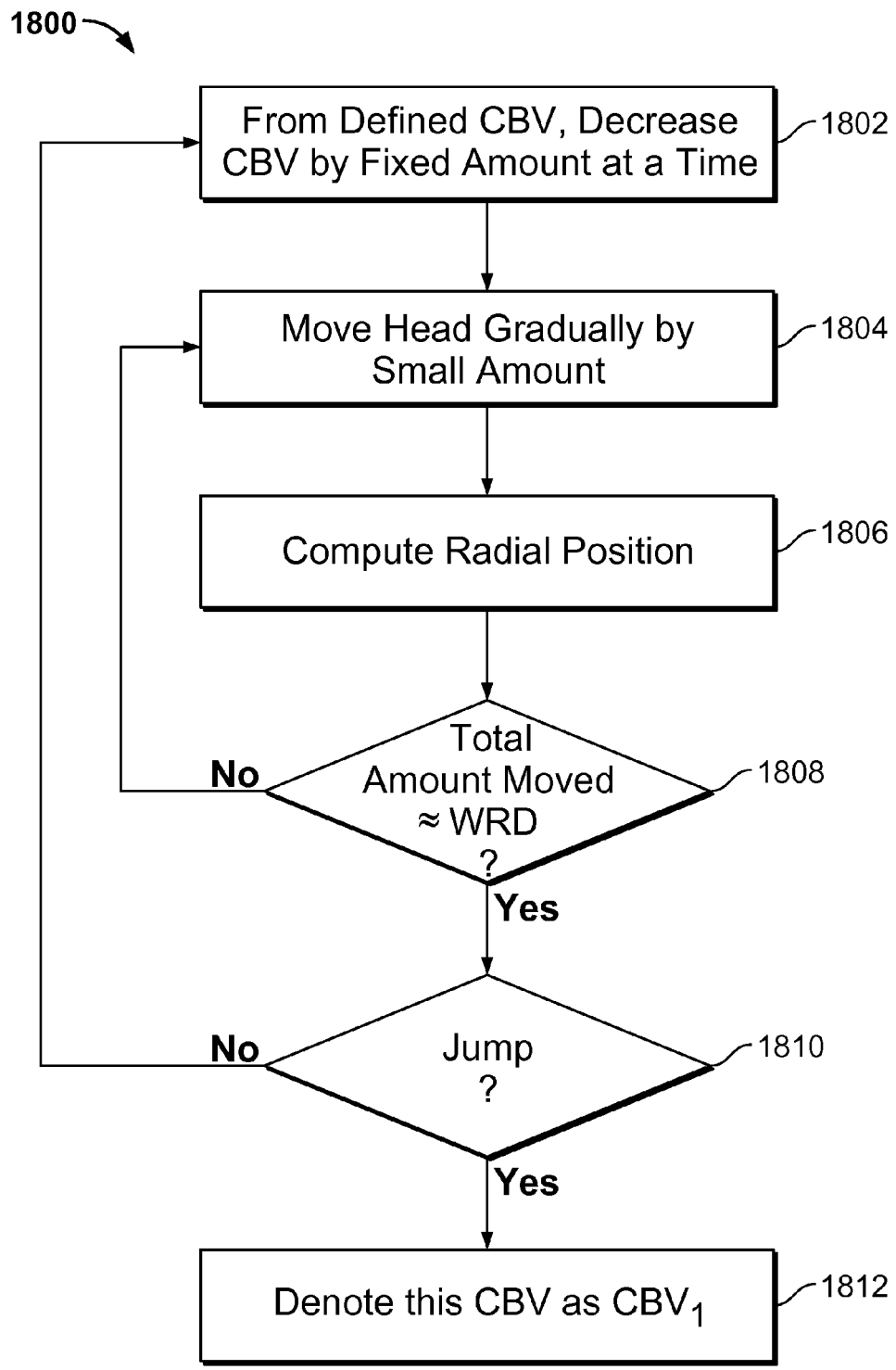
FIG. 18 is a flow chart illustrating an embodiment of a process for determining CBV1 by displacing the head by a small amount.

FIG. 18 is a flow chart illustrating an embodiment of a process for determining CBV1 by displacing the head by a small amount.

At 1802, from an initial CBV, decrease the CBV by a fixed amount at a time. At 1804, move the head gradually by a small amount (e.g., much less than WRD). At 1806, compute the radial head position Pfinal. At 1808, determine whether the total radial amount the head moved is approximately equal to WRD (called WRD-move). If WRD-move is not approximately equal to WRD, then return to 1804. If WRD-move is approximately equal to WRD, then at 1810, determine whether there is a significant jump in the computed radial head position Pfinal during WRD-move. In some embodiments, a significant jump means there is a discontinuity (e.g., discontinuity in change of position value) between the previous value of CBV and the current value of CBV. If there is no significant jump in the computed radial head position during WRD-move, then return to 1802. If there is a significant jump in the computed radial head position during WRD-move, then at 1812, denote the current value of CBV as CBV1.

In other words, keep decreasing CBV until a significant jump is seen in calculating the radial position during WRD-move.

Figure 19:
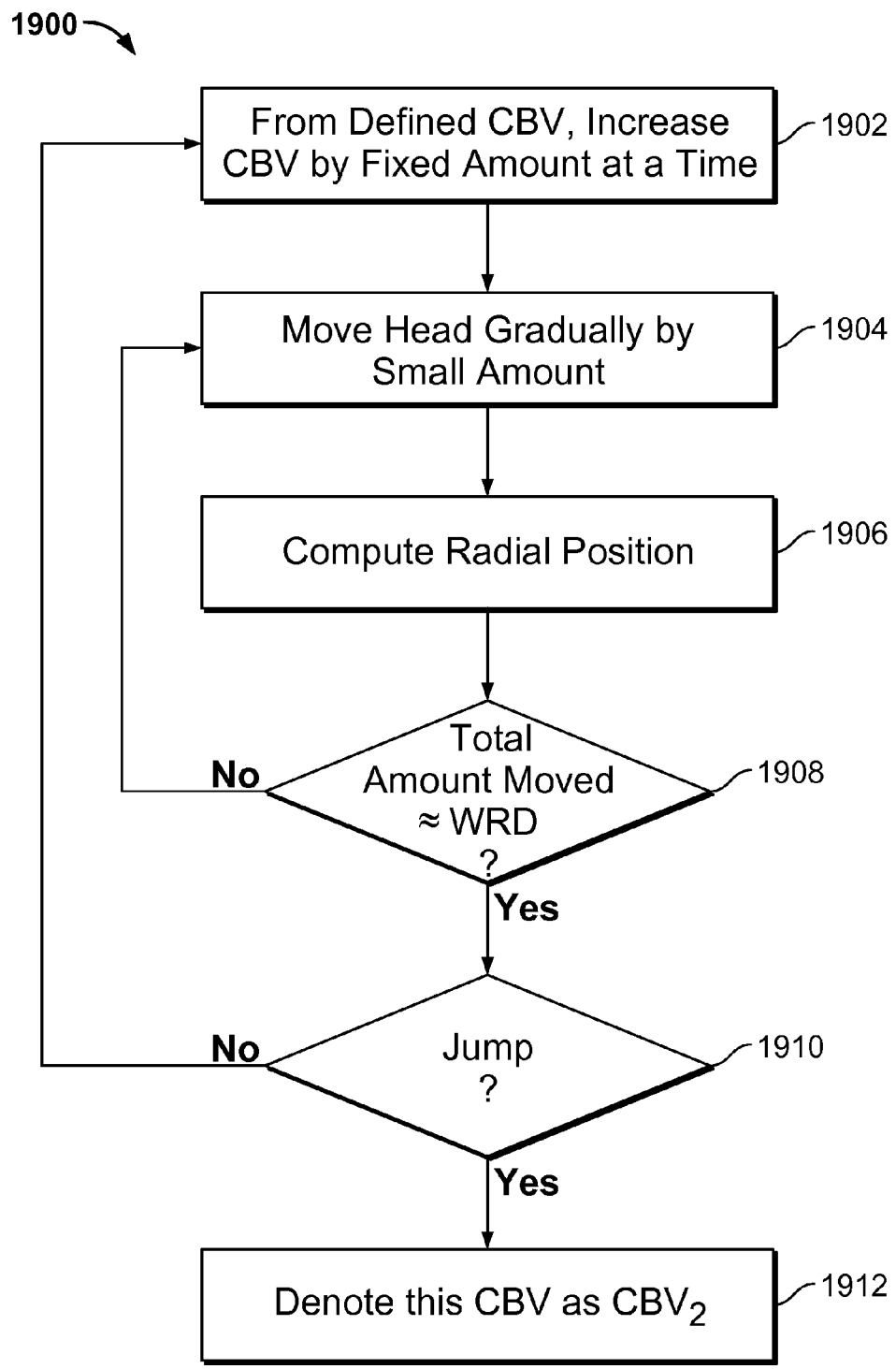
FIG. 19 is a flow chart illustrating an embodiment of a process for determining CBV2 by displacing the head by a small amount.

FIG. 19 is a flow chart illustrating an embodiment of a process for determining CBV2 by displacing the head by a small amount.

At 1902, from an initial CBV, increase the CBV by a fixed amount at a time. At 1904, move the head gradually by a small amount (e.g., much less than WRD). At 1906, compute the radial head position Pfinal. At 1908, determine whether the total radial amount the head moved is approximately equal to WRD (called WRD-move). If WRD-move is not approximately equal to WRD, then return to 1904. If WRD-move is approximately equal to WRD, then at 1910, determine whether there is a significant jump in the computed radial head position Pfinal during WRD-move. If there is no significant jump in the computed radial head position during WRD-move, then return to 1902. If there is a significant jump in the computed radial head position during WRD-move, then denote the current value of CBV as CBV2.

In other words, keep increasing CBV until a significant jump is seen in calculating the radial position during WRD-move.

In some embodiments, the choice of CBV is very robust to environment variation, i.e., CBV calibration may not be needed since this technique works with a large error in the CBV.

Figure 20:
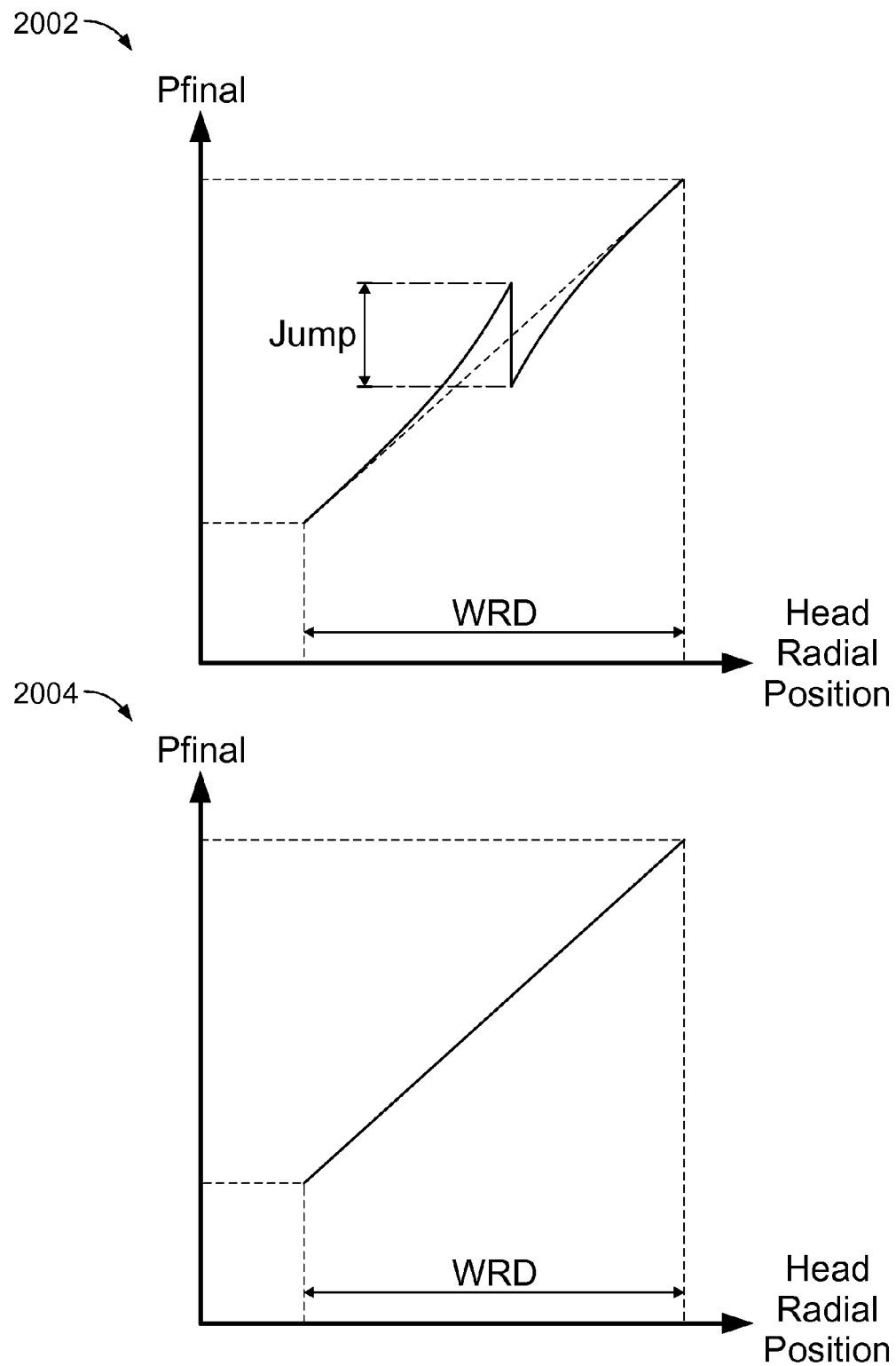
FIG. 20 illustrates examples of the computed radial head position (Pfinal) during WRD-move.

FIG. 20 illustrates examples of the computed radial head position (Pfinal) during WRD-move.

In this embodiment, a significant jump means there is a discontinuity between the previous value of CBV and the current value of CBV.

Plot 2002 shows an example in which there is a significant jump or discontinuity in Pfinal (e.g., 1810 and 1910) when the head has moved a total distance of approximately WRD.

Plot 2004 shows an example in which there is not a significant jump in Pfinal (e.g., 1810 and 1910) when the head has moved a total distance of approximately WRD.

Figure 21:
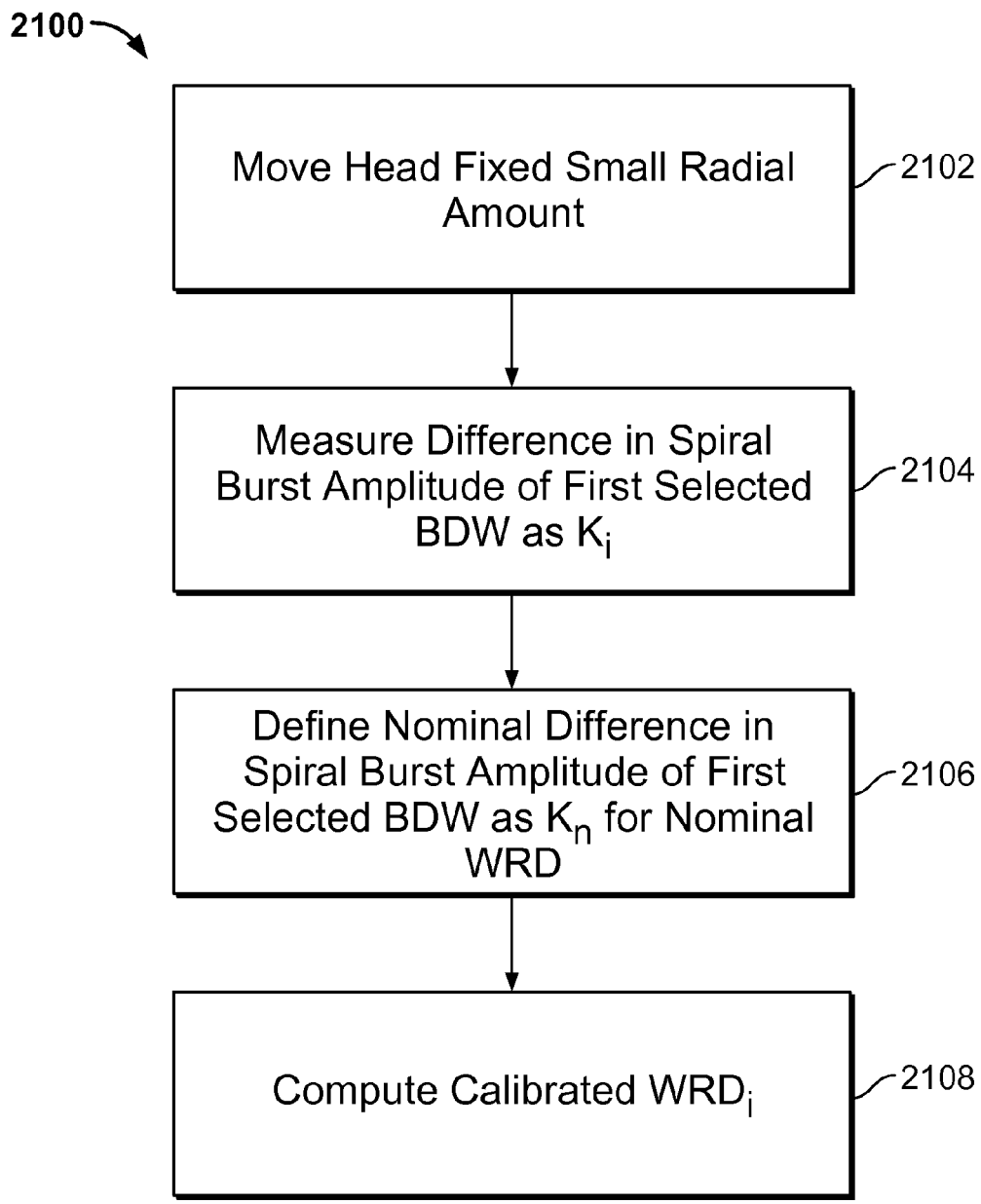
FIG. 21 is a flow chart illustrating an embodiment of a process for calibrating the WRD by displacing the head by a small amount

FIG. 21 is a flow chart illustrating an embodiment of a process for calibrating the WRD by displacing the head by a small amount. In some embodiments, the WRD is a function of the head radial position. In such embodiments, the WRD for various head radial positions is calibrated according to process 2100.

The WRD depends on the angle between the spiral waveform and the head tangential direction or its radial direction. If, during the writing of the spiral waveform, this angle is well controlled to be constant from the ID to the OD of the disk, then WRD will not need to be recalibrated when going from the ID to the OD. If the angle is not well controlled, then in some embodiments, the WRD is recalibrated at different positions according to process 2100.

At 2102, move the head for a fixed small radial amount about WRD or smaller. In some embodiments, a small fixed amplitude sine wave disturbance is injected into the head radial position control loop. The radial movement is small such that the first selected Burst Demodulation Window remains in the same Burst Demodulation Window.

At 2104, measure the difference in Spiral Burst Amplitude of the first selected Burst Demodulation Window, resulting from moving the head at 2102. Denote this difference as Ki.

At 2106, define a nominal difference in Spiral Burst Amplitude of the first selected Burst Demodulation Window as Kn for a nominal Window Radial Distance WRDn.

At 2108, the calibrated value WRDi of the current disk region is $$WRDi = WRDn \times \frac{Ki}{Kn}$$

In some embodiments, a table of Ki or Ki/Kn values is stored for different radial position regions. For example, there may be three different radial position regions (and process 2102-2104 is performed for each region to obtain Ki). Pfinal is first computed with WRDn. Based on which region Pfinal falls in, one of the Ki (or Ki/Kn) values is selected. Pfinal is then computed using the equation at 2108.

Spiral Offset

In some embodiments, there are multiple spiral segments in a wedge to wedge time interval. In some embodiments, instead of using the first spiral segment to compute the radial head position, a second spiral segment (i.e., any spiral segment) may be used. In some embodiments, this can be done by adding a spiral offset at 906 in FIG. 9.

Two different spiral segments, either in the same counter period or in different counter periods, should give the same result in head radial position if the head is on track (i.e., has an equivalent radial position).

Assume the second spiral segment has the first selected Burst Demodulation Window as BDWj (1≤j≤n, BDWj can be either in the same or different counter period as the first spiral segment).

When the head is on track, if the radial head position calculated from the first spiral segment is Pfinal, then the radial head position calculated from the second spiral segment will be:

$$Pfinal2 = Prn + signRAD \times signSPI \times signSAS \times \frac{(CBV - B1n)}{|B1n - B2n|} \times WRD + Offset$$

where:

$$Prn = signRAD \times signSPI \times j \times WRD$$

B1n, B2n are the Spiral Burst Amplitude of the first selected Burst Demodulation Window and the second selected Burst Demodulation Window of the second spiral segment, respectively.

Offset is the spiral offset value of the second spiral segment, which is calculated when the head is on track as:

$$Offset = Pfinal - Prn - signRAD \times signSPI \times signSAS \times \frac{(CBV - B1n)}{|B1n - B2n|} \times WRD$$

By adding this Offset value defined for each spiral segment in relation to the first spiral segment, the radial head position may be computed based on the first spiral segment or a second spiral segment (i.e., any desired spiral segment). Either will give the same result in radial head position. This allows switching from using the first spiral segment to any spiral segment to detect radial head position without increasing error in the computed radial head position relative to the actual radial head position.

Figure 22:
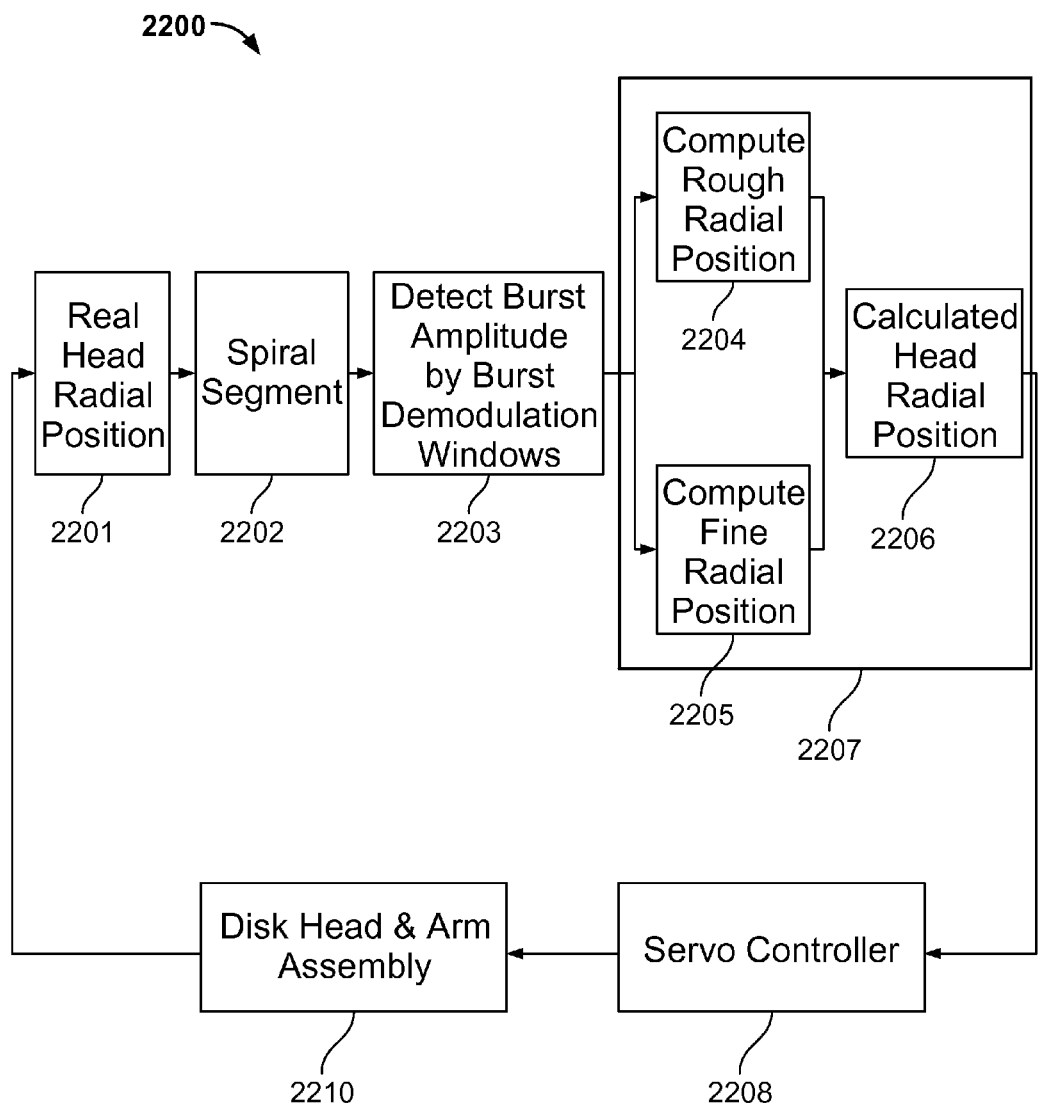
FIG. 22 is a block diagram illustrating an embodiment of a system for computing a head radial position.

FIG. 22 is a block diagram illustrating an embodiment of a system for computing a head radial position. In some embodiments, the head radial position is used to write servo wedge code to a disk. In various embodiments, one or more portions of system 2200 may be implemented in software, firmware, and/or hardware. In various embodiments, system 2200 is configured to perform one or more steps of processes 900, 1000, 1500, 1600, 1700, 1800, 1900, and 2100. System 2200 is shown to include: real (i.e., actual) head radial position 2201, spiral segment 2202, burst amplitude detector 2203, block 2207, servo controller 2208, and disk head and arm assembly 2210. Block 2207 includes rough radial position computation block 2204, fine radial position computation block 2205, and final head radial position computation block 2206.

In this example, real head radial position 2201 is input to spiral segment 2202, which generate a spiral segment signal at the current head radial position when it intersects with the spiral waveform. The spiral segment is input to burst amplitude detector 2203, which detect the spiral segment burst amplitude using burst demodulation windows. For example, burst amplitude detector performs 1002-1008 in some embodiments. Rough radial position computation block 2204 computes a rough radial head position, e.g., by performing 1010. Fine radial position computation block 2205 computes a fine radial head position, e.g., by performing 1602. Final head radial position block computes the final radial head position, e.g., by performing 1604. The final head radial position is input to servo controller 2208, which performs head radial positioning, which is provided as input to disk head and arm assembly 2210.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for writing servo wedge code to a disk, comprising:
   determining a first selected burst demodulation window;
   using a processor to compute a final radial head position based at least in part on the first selected burst demodulation window, wherein:
   (1) the final radial head position is computed based at least in part on both the first selected burst demodulation window and a second selected burst demodulation window;
   (2) the first selected burst demodulation window and the second selected burst demodulation window are associated with a first spiral burst amplitude and a second spiral burst amplitude, respectively, and the first spiral burst amplitude and the second spiral burst amplitude are adjacent to a central burst value; and
   (3) the final radial head position is further computed at least in part by computing the difference between the first spiral burst amplitude and the central burst value; and
   writing servo wedge code to a disk based at least in part on the final radial head position.

2. A method as recited in claim 1, wherein computing the final radial head position further comprises:
   computing a rough radial head position based at least in part on the first selected burst demodulation window;
   computing a fine radial head position based at least in part on a second selected burst demodulation window; and
   combining the rough radial head position and the final radial head position to obtain the final radial head position.

3. A method as recited in claim 2, wherein combining the rough radial head position and the fine radial head position to obtain a final radial head position comprises summing the rough radial head position and the final radial head position to obtain the final radial head position.

4. A method as recited in claim 1, wherein the final radial head position is computed based at least in part on an index of the first selected burst demodulation window.

5. A method as recited in claim 1, wherein the first selected burst demodulation window is associated with a first spiral burst amplitude that is adjacent to a central burst value.

6. A method as recited in claim 1, wherein the central burst value is selected from a linear portion of a radial burst amplitude curve.

7. A method as recited in claim 1, wherein the final radial head position is computed based on no more than two burst demodulation windows.

8. A method as recited in claim 1, wherein the final radial head position is computed based on no more than one half of one spiral segment.

9. A method as recited in claim 1, wherein the final radial head position is computed based at least in part on a spiral offset value associated with a desired spiral segment used to detect the final radial head position.

10. A method as recited in claim 1, wherein the first selected burst demodulation window changes depending on the radial position of the head.

11. A method as recited in claim 1, wherein the first selected burst demodulation window includes a preamble waveform but not a sync mark waveform.

12. A method as recited in claim 1, wherein computing the final radial head position includes computing an offset value between two spiral segments.

13. A method for writing servo wedge code to a disk, comprising:
   determining a first selected burst demodulation window;
   using a processor to compute a final radial head position based at least in part on the first selected burst demodulation window, wherein:

(1) the final radial head position is computed based at least in part on both the first selected burst demodulation window and a second selected burst demodulation window;
(2) the first selected burst demodulation window and the second selected burst demodulation window are associated with a first spiral burst amplitude and a second spiral burst amplitude, respectively, and the first spiral burst amplitude and the second spiral burst amplitude are adjacent to a central burst value; and
(3) the final radial head position is further computed at least in part by:
computing the difference between the first spiral burst amplitude and the second spiral burst amplitude; and
taking the absolute value of the difference between the first spiral burst amplitude and the second spiral burst amplitude; and
writing servo wedge code to a disk based at least in part on the final radial head position.

14. A method for writing servo wedge code to a disk, comprising:
determining a first selected burst demodulation window;
using a processor to compute a final radial head position based at least in part on the first selected burst demodulation window;
writing servo wedge code to a disk based at least in part on the final radial head position; and
calibrating a center burst value at least in part by displacing a head and determining whether there is a discontinuity.

15. A method for writing servo wedge code to a disk, comprising:
determining a first selected burst demodulation window;
using a processor to compute a final radial head position based at least in part on the first selected burst demodulation window;
writing servo wedge code to a disk based at least in part on the final radial head position; and
calibrating a window radial distance at least in part by displacing a head and determining a difference in spiral burst amplitude.

16. A system for writing servo wedge code to a disk, comprising:
a processor configured to:
determine a first selected burst demodulation window;
compute a final radial head position based at least in part on the first selected burst demodulation window, wherein:
(1) the final radial head position is computed based at least in part on both the first selected burst demodulation window and a second selected burst demodulation window;
(2) the first selected burst demodulation window and the second selected burst demodulation window are associated with a first spiral burst amplitude and a second spiral burst amplitude, respectively, and the first spiral burst amplitude and the second spiral burst amplitude are adjacent to a central burst value; and
(3) the final radial head position is further computed at least in part by computing the difference between the first spiral burst amplitude and the central burst value; and
write servo wedge code to a disk based at least in part on the final radial head position; and
a communication interface coupled to the processor.

17. A system as recited in claim 16, wherein the processor is configured to compute the final radial head position at least in part by:
computing a rough radial head position based at least in part on the first selected burst demodulation window;
computing a fine radial head position based at least in part on a second selected burst demodulation window; and
combining the rough radial head position and the final radial head position to obtain the final radial head position.

18. A system for writing servo wedge code to a disk, comprising:
a processor configured to:
determine a first selected burst demodulation window;
compute a final radial head position based at least in part on the first selected burst demodulation window, wherein:
(1) the final radial head position is computed based at least in part on both the first selected burst demodulation window and a second selected burst demodulation window;
(2) the first selected burst demodulation window and the second selected burst demodulation window are associated with a first spiral burst amplitude and a second spiral burst amplitude, respectively, and the first spiral burst amplitude and the second spiral burst amplitude are adjacent to a central burst value; and
(3) the final radial head position is further computed at least in part by:
computing the difference between the first spiral burst amplitude and the second spiral burst amplitude; and
taking the absolute value of the difference between the first spiral burst amplitude and the second spiral burst amplitude; and
write servo wedge code to a disk based at least in part on the final radial head position; and
a communication interface coupled to the processor.

19. A system for writing servo wedge code to a disk, comprising:
a processor configured to:
determine a first selected burst demodulation window;
compute a final radial head position based at least in part on the first selected burst demodulation window;
write servo wedge code to a disk based at least in part on the final radial head position; and
calibrate a center burst value at least in part by displacing a head and determining whether there is a discontinuity; and
a communication interface coupled to the processor.

20. A system for writing servo wedge code to a disk, comprising:
a processor configured to:
determine a first selected burst demodulation window;
compute a final radial head position based at least in part on the first selected burst demodulation window;
write servo wedge code to a disk based at least in part on the final radial head position; and
calibrate a window radial distance at least in part by displacing a head and determining a difference in spiral burst amplitude; and
a communication interface coupled to the processor.

* * * * *